(12) United States Patent
Seong

(10) Patent No.: US 12,304,340 B2
(45) Date of Patent: May 20, 2025

(54) DISTANCE ESTIMATION METHOD FOR FINE POSITIONING FOR ELECTRIC VEHICLE WIRELESS POWER TRANSFER, AND DISTANCE ESTIMATION APPARATUS USING SAME

(71) Applicants: Hyundai Motor Company, Seoul (KR); Kia Corporation, Seoul (KR)

(72) Inventor: Jae Yong Seong, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 182 days.

(21) Appl. No.: 18/267,269

(22) PCT Filed: Dec. 16, 2021

(86) PCT No.: PCT/KR2021/019224
§ 371 (c)(1),
(2) Date: Jun. 14, 2023

(87) PCT Pub. No.: WO2022/131830
PCT Pub. Date: Jun. 23, 2022

(65) Prior Publication Data
US 2024/0051415 A1 Feb. 15, 2024

Related U.S. Application Data

(60) Provisional application No. 63/126,759, filed on Dec. 17, 2020.

(30) Foreign Application Priority Data

Dec. 16, 2021 (KR) .................... 10-2021-0180583

(51) Int. Cl.
*B60L 53/36* (2019.01)
*B60L 53/66* (2019.01)
(Continued)

(52) U.S. Cl.
CPC ............ *B60L 53/36* (2019.02); *B60L 53/66* (2019.02); *H02J 50/80* (2016.02); *H02J 50/90* (2016.02)

(58) Field of Classification Search
CPC .......... B60L 53/36; B60L 53/66; B60L 53/38; H02J 50/80; H02J 50/90; Y02T 10/70; Y02T 10/7072; Y02T 90/12; Y02T 90/16
See application file for complete search history.

(56) References Cited

U.S. PATENT DOCUMENTS

2012/0161696 A1   6/2012   Cook et al.
2017/0288739 A1* 10/2017   Shin ...................... H04W 52/42
(Continued)

FOREIGN PATENT DOCUMENTS

EP         2 928 046 A1   10/2015
KR       10-1257676 B1     5/2013
(Continued)

*Primary Examiner* — Jeffrey M Shin
(74) *Attorney, Agent, or Firm* — Fox Rothschild LLP

(57) ABSTRACT

A method for estimating distance using low frequency (LF) signals when performing fine positioning for electric vehicle (EV) wireless power transfer (WPT) includes steps of: restricting a position of a first transmitter of an EV to a point on a first straight line extending towards a center of a primary device of a power supply device; restricting a position of a second transmitter of the EV to a point on a second straight line extending towards the center of the primary device; compensating, on the first straight line or the second straight line, for the distance between the first transmitter and the second transmitter based on the time difference of LF signals arriving at the primary device; and calculating the positions of the first and second transmitters such that first and second distances from starting points on the first and second straight lines to the first and transmitters, respectively.

20 Claims, 22 Drawing Sheets

(51) Int. Cl.
  *H02J 50/80*  (2016.01)
  *H02J 50/90*  (2016.01)

(56) References Cited

U.S. PATENT DOCUMENTS

2017/0361725 A1* 12/2017 Seong ..................... G01D 5/20
2018/0241258 A1   8/2018 Seong

FOREIGN PATENT DOCUMENTS

KR  10-2017-0142065 A   12/2017
KR  10-2018-0095445 A    8/2018

* cited by examiner

FIG. 5A
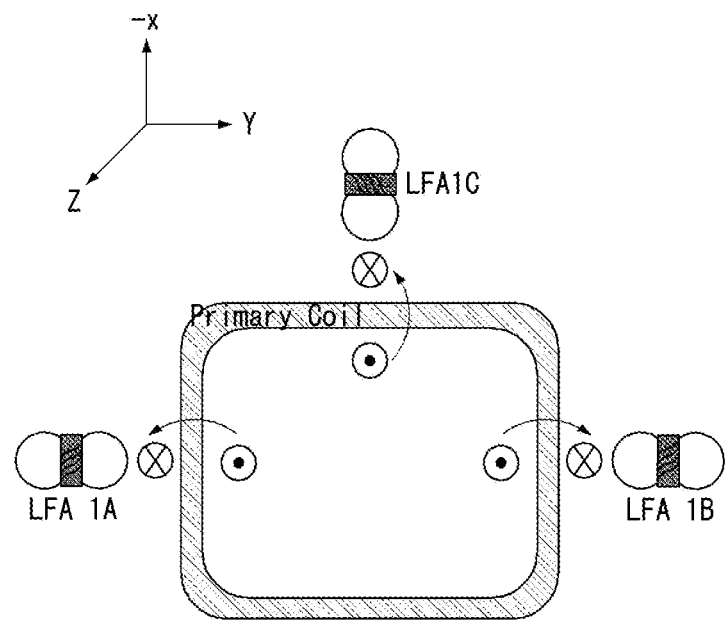
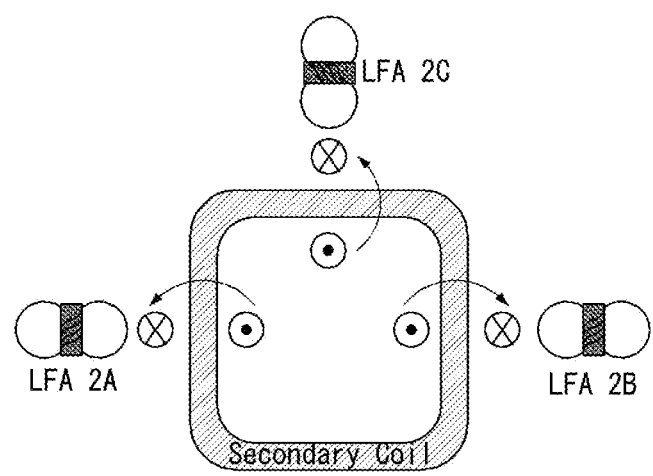

FIG. 5D
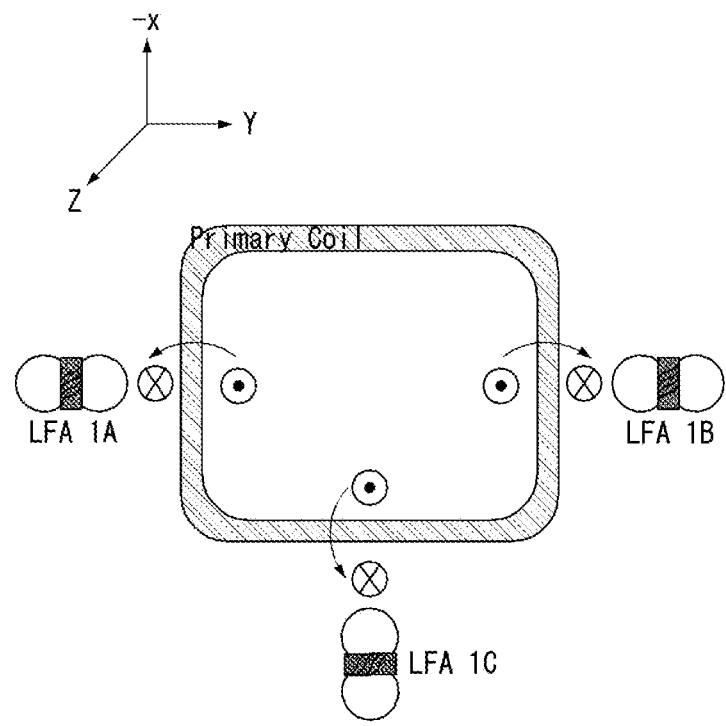
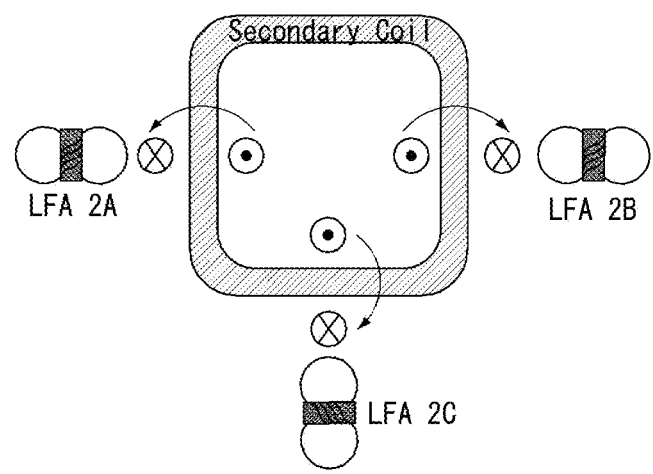

(a)　　　(b)

(a)　　　(b)

DISTANCE ESTIMATION METHOD FOR FINE POSITIONING FOR ELECTRIC VEHICLE WIRELESS POWER TRANSFER, AND DISTANCE ESTIMATION APPARATUS USING SAME

CROSS-REFERENCE TO RELATED APPLICATIONS

The present application is a U.S. National Phase application 35 U.S.C. § 371 of International Application No. PCT/KR2021/019224 filed on Dec. 16, 2021, which claims under 35 U.S.C. § 119(e) the benefit of U.S. Provisional Application No. 63/126,759 filed on Dec. 17, 2020 and Korean Patent Application No. 10-2021-0180583 filed on Dec. 16, 2021, the entire contents of which are incorporated by reference herein.

BACKGROUND

(a) Technical Field

The present disclosure relates to a method for distance estimation using low-frequency (LF) signals, more particularly, to a method and an apparatus for position estimation using LF signals in fine positioning for electric vehicle (EV) wireless power transfer (WPT).

(b) Description of the Related Art

In a magnetic field (MF)-based wireless power transfer (WPT) system, communication between an electric vehicle communication controller (EVCC) and a supply equipment communication controller (SECC) is typically established using a an SECC discovery protocol (SDP). Signals or messages are transmitted and received through point-to-point signal (P2PS) signaling using low-frequency (LF) signals, low power excitation (LPE), optical markings such as Quick Response (QR) codes, or the like without the need of a pairing and positioning device (PPD).

In a vehicle-to-grid (V2G) communication session for wireless power transfer, messages between the EVCC and the SECC follow procedures such as fine positioning setup, fine positioning, and pairing in the order described. Here, the fine positioning or positioning is to continuously provide alignment information while an EV is approaching a supply device to support the EV to approach within an alignment tolerance range. The pairing is used to ensure that both the EVCC and the SECC can uniquely identify a primary device located in the EV.

Meanwhile, a fine positioning request message among SDP messages or fine positioning messages includes compatibility information and an electric vehicle identifier (EVID). That is, the fine positioning request message usually includes information of a plurality of compatible SECCs, and a fine positioning response message includes information on only one specific SECC. In this case, the EV may align the secondary device on the primary device acquired through information sharing with the specific SECC in the fine positioning procedure.

However, when the EVCC cannot specify a position of a center point or a second reference point of the secondary device relative to a center point or a first reference point of the primary device through data acquired from the SECC connected through a wireless local area network (WLAN), the fine positioning procedure cannot be performed.

In addition, when a data transmission rate is low due to a low data transmission capacity of the wireless LAN, it may be difficult to normally perform the fine positioning within a certain time because the center point of the secondary device cannot be specified in real time.

In addition, since the antenna arrangement of the primary device is determined by a manufacturer of the primary device, there may be primary devices having various antenna arrangements. In such the environment, a vehicle controller or EVCC of the EV may not be able to acquire information on the antenna arrangement of the primary device in advance or in real time. In that case, it may not be easy to align the secondary device of the EV on the primary device of an EV supply equipment using the existing LF-based fine positioning method, and the alignment may be practically impossible in many cases.

As described above, there is a need for a fine positioning method that is robust against various problems that may occur in the fine positioning procedure for EVs in various EV-WPT environments.

SUMMARY

The present disclosure provides a distance estimation method and apparatus for fine positioning, which can effectively align a center of a secondary device of an EV device with a center of a primary device of a supply device in fine positioning for EV wireless power transfer (WPT) by using only information on receivers of the primary device, information on transmitters of the secondary device, and LF signals.

Another objective of the present disclosure is to provide a distance estimation method and apparatus for EV-WPT fine positioning, which can effectively align a primary device and a secondary device using LF signals without requiring information on antenna arrangement in the primary device.

Yet another objective of the present disclosure is to provide a distance estimation method and apparatus for fine positioning. The distance estimation method and apparatus can perform LF signal-based fine positioning based on information on transmitters and receiver, which is shared between an EVCC and an SECC through a wireless LAN, even when information on positions of the transmitters or receivers for the fine positioning cannot be obtained based on data shared through data communication.

A position estimation method for fine positioning, according to an aspect of the present disclosure for resolving the above-described technical problem, as a position estimation method for fine positioning, performed by an EV or an EV device having an EV communication controller (EVCC) connected with a supply equipment communication controller (SECC) of a supply device through a network and a secondary device equipped with at least a first transmitter and a second transmitter, may comprise: defining a position of the first transmitter as a point on a first straight line directed toward a center of a primary device of the supply device; defining a position of the second transmitter as a point on a second straight line directed toward the center of the primary device; compensating for an interval between the first transmitter and the second transmitter on the first straight line or the second straight line based on a time difference of LF signals of the first transmitter and the second transmitter arriving at the primary device; and calculating the position of the first transmitter and the position of the second transmitter such that a first distance from a first start point on the first straight line to the first transmitter becomes equal to a second distance from a second start point on the second straight line to the second transmitter through the compensating.

In the compensating, the first start point on the first straight line, which is determined based on a time difference between signal reception times at a first receiver and a second receiver of the primary device for a first LF signal of the first transmitter in the defining of the position of the first transmitter, may be moved on the first straight line by a distance obtained by multiplying the time difference by a speed of light.

The second receiver may be located closer to the first transmitter and the second transmitter than the first receiver.

In the compensating, the second start point on the second straight line, which is determined based on a time difference between signal reception times at a first receiver and a second receiver of the primary device for a second LF signal of the second transmitter in the defining of the position of the second transmitter, may be moved on the second straight line by a distance obtained by multiplying the time difference by a speed of light.

The first receiver may be located closer to the first transmitter and the second transmitter than the second receiver.

The position estimation method may further comprise: determining a position on the first straight line and a position on the second straight line where an interval between the first straight line and the second straight line is equal to a distance between the first transmitter and the second transmitter as the position of the first transmitter and the position of the second transmitter, respectively.

The position estimation method may further comprise: determining a distance and a direction of a center of the secondary device with respect to a center of the primary device, which is obtained based on the position of the first transmitter and the position of the second transmitter.

The defining of the position of the first transmitter may comprise: calculating a first time difference between reception times at a first receiver and a second receiver for a first LF signal; generating a first circle having a radius of half of a distance obtained by multiplying the first time difference by a speed of light with the second receiver as a center; generating a first tangent line that passes through the first receiver and is tangent to the first circle; and generating the first straight line passing through the first receiver and orthogonal to the first tangent line, wherein the position of the first transmitter is located on the first straight line with a second point where the first tangent line and the first straight line meet as a start point.

The defining of the position of the second transmitter may comprise: calculating a second time difference between reception times at a first receiver and a second receiver for a second LF signal; generating a second circle having a radius of half of a distance obtained by multiplying the second time difference by a speed of light with the second receiver as a center; generating a first tangent line that passes through the first receiver and is tangent to the second circle; and generating the second straight line passing through the first receiver and orthogonal to the second tangent line, wherein the position of the second transmitter is located on the second straight line with a fourth point where the second tangent line and the second straight line meet as a start point.

A position estimation method for fine positioning, according to another aspect of the present disclosure for resolving the above-described technical problem, as a position estimation method for fine positioning, performed by an EV or an EV device having an EVCC connected with an SECC of a supply device through a network and a secondary device equipped with at least a first transmitter and a second transmitter, may comprise: transmitting a first low frequency (LF) signal to a first receiver and a second receiver of a primary device of the supply device through the first transmitter, and defining a position of the first transmitter on a first straight line extending in a radial direction from a reference point of the supply based on receiving a response related to the first LF signal from the SECC; defining a position of the second transmitter on a second straight line extending in a radial direction from the reference point of the supply device based on transmitting a second LF signal to the first receiver and the second receiver through the second transmitter; calculating a time difference between the first LF signal and the second LF signal arriving at a receiver closer to the first transmitter and the second transmitter; in response to a transmitter located closer to the primary device being the first transmitter, determining a first-a start point obtained by moving a first start point of the first straight line toward the first transmitter on the first straight line by the time difference; and determining the position of the first transmitter located on the first straight line as a point where a distance from the first-a start point is the same as a distance between a second start point of the second straight line and the second transmitter.

The position estimation method may further comprise: in response to the transmitter located closer to the primary device being the second transmitter, determining a second-a start point obtained by moving a second start point of the second straight line toward the second transmitter on the second straight line by the time difference; and determining the position of the second transmitter located on the second straight line as a point where a distance from the second-a start point is the same as a distance between the first start point of the first straight line and the first transmitter.

The defining of the position of the first transmitter may comprise: calculating a first time difference between reception times at the first receiver and the second receiver for the first LF signal; generating a first circle having a radius of half of a distance obtained by multiplying the first time difference by a speed of light with the second receiver as a center; generating a first tangent line that passes through the first receiver and is tangent to the first circle; and generating a first normal line passing through the first receiver and orthogonal to the first tangent line, wherein the position of the first transmitter is located on the first normal line with a second point where the first tangent line and the first normal line meet as a start point.

The defining of the position of the second transmitter may comprise: calculating a second time difference between reception times at the first receiver and the second receiver for the second LF signal; generating a second circle having a radius of half of a distance obtained by multiplying the second time difference by a speed of light with the second receiver as a center; generating a second tangent line that passes through the first receiver and is tangent to the second circle; and generating a second normal line passing through the first receiver and orthogonal to the second tangent line, wherein the position of the second transmitter is located on the second normal line with a fourth point where the second tangent line and the second normal line meet as a start point.

The position estimation method may further comprise: determining a position on the first normal line and a position on the second normal line where an interval between the first tangent line and the second tangent line is equal to a distance between the first transmitter and the second transmitter as the position of the first transmitter and the position of the second transmitter, respectively.

The position estimation method may further comprise: determining a distance and a direction of a center of the secondary device with respect to a center of the primary device, which is obtained based on the position of the first transmitter and the position of the second transmitter.

A position estimation apparatus for fine positioning, according to yet another aspect of the present disclosure for resolving the above-described technical problem, as a position estimation apparatus for fine positioning, performed by an EV or an EV device having an EVCC connected with an SECC of a supply device through a network and a secondary device equipped with at least a first transmitter and a second transmitter, may comprise: a processor; and a memory storing instructions executable by the processor, wherein when executed by the processor, the instructions cause the processor to perform: defining a position of the first transmitter as a point on a first straight line directed toward a center of a primary device of the supply device; defining a position of the second transmitter as a point on a second straight line directed toward the center of the primary device; compensating for an interval between the first transmitter and the second transmitter on the first straight line or the second straight line based on a time difference of LF signals of the first transmitter and the second transmitter arriving at the primary device; and calculating the position of the first transmitter and the position of the second transmitter such that a first distance from a first start point on the first straight line to the first transmitter becomes equal to a second distance from a second start point on the second straight line to the second transmitter through the compensating.

The instructions may cause the processor to perform: in the compensating, moving the first start point on the first straight line, which is determined based on a time difference between signal reception times at a first receiver and a second receiver of the primary device for a first LF signal of the first transmitter in the defining of the position of the first transmitter, on the first straight line by a distance obtained by multiplying the time difference by a speed of light.

The instructions may cause the processor to perform: in the compensating, moving the second start point on the second straight line, which is determined based on a time difference between signal reception times at a first receiver and a second receiver of the primary device for a second LF signal of the second transmitter in the defining of the position of the second transmitter, on the second straight line by a distance obtained by multiplying the time difference by a speed of light.

The instructions may cause the processor to perform: in the defining of the position of the first transmitter, calculating a first time difference between reception times at a first receiver and a second receiver for a first LF signal; generating a first circle having a radius of half of a distance obtained by multiplying the first time difference by a speed of light with the second receiver as a center; generating a first tangent line that passes through the first receiver and is tangent to the first circle; and generating the first straight line passing through the first receiver and orthogonal to the first tangent line, wherein the position of the first transmitter is located on the first straight line with a second point where the first tangent line and the first straight line meet as a start point.

The instructions may cause the processor to perform: in the defining of the position of the second transmitter, calculating a second time difference between reception times at a first receiver and a second receiver for a second LF signal; generating a second circle having a radius of half of a distance obtained by multiplying the second time difference by a speed of light with the second receiver as a center; generating a first tangent line that passes through the first receiver and is tangent to the second circle; and generating the second straight line passing through the first receiver and orthogonal to the second tangent line, wherein the position of the second transmitter is located on the second straight line with a fourth point where the second tangent line and the second straight line meet as a start point.

Advantageous Effects

According to the present disclosure, in a fine positioning procedure for WPT between an EV and a power grid, a distance and direction of a predetermined reference point on a secondary device from a predetermined reference point on a primary device can be effectively estimated based on antenna information of the primary device and the secondary device and LF signal-based point-to-point signal (P2PS) signaling, without sharing location information via a WLAN.

In addition, according to the present disclosure, a distance and direction required for fine positioning can be effectively calculated by the EV in an environment where antenna location information cannot be delivered or shared through data communication. In this case, the EV can perform the fine positioning by controlling its movement while periodically calculating a distance and direction of a second center point of the secondary device from a first center point of the primary device.

In addition, in an EV configured to perform a fine positioning procedure by delivering or sharing antenna location information through data communication, a case may occur in which the fine positioning procedure cannot be normally performed because relative location information of the primary device and the secondary device cannot be shared due to an error in at least one of hardware and software for the fine positioning. According to the present disclosure, if only antenna information of the primary device is shared in the above-described case, a location of each of antennas can be specified using LF signals based on the antenna information of the primary device and antenna information of the secondary device, which is known in advance, and thus the error in the fine positioning procedure can be effectively dealt with.

In addition, according to the present disclosure, in a WPT fine positioning procedure for an EV, a vehicle entry direction may be determined at an early stage according to an antenna type of the primary device and an antenna type of the secondary device, and the entry direction or posture of the EV entering a parking area or charging area can be guided based thereon. Accordingly, efficiency in the fine positioning can be increased and user convenience can be increased.

BRIEF DESCRIPTION OF DRAWINGS

FIGS. 5A to 5D are diagrams for describing a process performed in a state in which the primary device and the secondary device to which a distance estimation method for WPT fine positioning according to an exemplary embodiment of the present disclosure is applicable.

DETAILED DESCRIPTION

Figure 1:
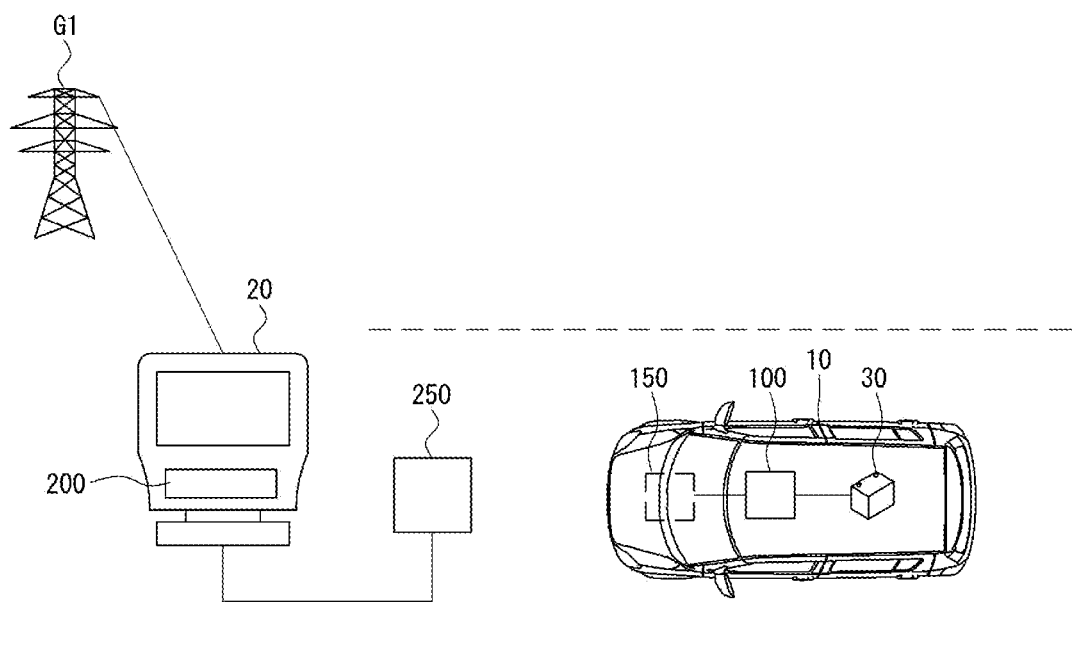
FIG. 1 is a diagram for schematically describing an overall configuration of a magnetic field (MF)-based WPT system to which a distance estimation method for WPT fine positioning according to an exemplary embodiment of the present disclosure is applicable.

Since the present disclosure may be variously modified and have several forms, specific exemplary embodiments will be shown in the accompanying drawings and be described in detail in the detailed description. It should be understood, however, that it is not intended to limit the present disclosure to the specific exemplary embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without departing from the scope of the present disclosure, and the second component may also be similarly named the first component. The term "and/or" means any one or a combination of a plurality of related and described items.

When it is mentioned that a certain component is "coupled with" or "connected with" another component, it should be understood that the certain component is directly "coupled with" or "connected with" to the other component or a further component may be disposed therebetween. In contrast, when it is mentioned that a certain component is "directly coupled with" or "directly connected with" another component, it will be understood that a further component is not disposed therebetween.

The terms used in the present disclosure are only used to describe specific exemplary embodiments, and are not intended to limit the present disclosure. The singular expression includes the plural expression unless the context clearly dictates otherwise. In the present disclosure, terms such as 'comprise' or 'have' are intended to designate that a feature, number, step, operation, component, part, or combination thereof described in the specification exists, but it should be understood that the terms do not preclude existence or addition of one or more features, numbers, steps, operations, components, parts, or combinations thereof.

Unless otherwise defined, all terms (including technical and scientific terms) used herein have the same meaning as commonly understood by one of ordinary skill in the art to which this disclosure belongs. Terms that are generally used and have been in dictionaries should be construed as having meanings matched with contextual meanings in the art. In this description, unless defined clearly, terms are not necessarily construed as having formal meanings.

Additional terms used in the present disclosure are defined as follows.

"Electric vehicle (EV)" may refer to an automobile defined in 49 code of federal regulations (CFR) 523.3 or the like. The EV may be used on highways and driven by electricity supplied from a vehicle-mounted energy storage device such as a battery rechargeable from a power source outside the vehicle. The power supply source may include a residence, a public electric service, or a generator using vehicle-mounted fuel. The EV may be referred to as an electric car, an electric automobile, an electric road vehicle (ERV), a plug-in vehicle (PV), a plug-in vehicle (xEV), or the like, the xEV may be referred to as or classified into a plug-in all-electric vehicle or battery electric vehicle (BEV), a plug-in electric vehicle (PEV), a hybrid electric vehicle (HEV), a hybrid plug-in electric vehicle (HPEV), a plug-in hybrid electric vehicle (PHEV), or the like.

"Plug-in Electric Vehicle (PEV)" may refer to an EV that recharges the on-vehicle primary battery by connecting to the power grid.

"Wireless power charging system (WCS)" may refer to a system for wireless power transfer, alignment, and communication between a ground assembly (GA) and a vehicle assembly (VA).

"Wireless power transfer (WPT)" may refer to a technology that transfers or receives electric power to and from an EV through non-contact means such as electromagnetic induction and resonance from a power source such as utility, grid, energy storage device, and fuel cell generator.

"Utility": A set of systems which supply electrical energy and may include a customer information system (CIS), an advanced metering infrastructure (AMI), rates and revenue system, etc. The utility may provide the EV with energy based on a rates table and discrete events. Additionally, the utility may provide information about certification of EVs, interval of power consumption measurements, and a tariff.

"Smart charging": A system in which EVSE and/or PEV communicate with power grid to optimize charging ratio or discharging ratio of EV by reflecting capacity of the power grid or expense of use.

"Interoperability": A state in which components of a system interwork with corresponding components of the system to perform operations aimed by the system. Additionally, information interoperability may refer to capability that two or more networks, systems, devices, applications, or components may efficiently share and easily use information without causing inconvenience to users.

"Inductive charging system": A system transferring energy from a power source to an EV via a two-part gapped core transformer in which the two halves of the transformer, i.e., primary and secondary coils, are physically separated from one another. In the present disclosure, the inductive charging system may correspond to an EV power transfer system.

"Inductive coupling": Magnetic coupling between two coils. In the present disclosure, coupling between the GA Coil and the VA Coil.

"Original equipment manufacturer (OEM)": An EV manufacturer or a server operated by the EV manufacturer. It may include a root certification authority (CA) or a root certification server that issues an OEM root certificate.

"Power grid operator (V2G operator)": A primary actor participating in V2G communication using a transmission protocol, or an entity for initiation of a blockchain for automatic authentication of an EV or EV user and creation of a smart contract on the blockchain. It may include at least one trusted certification authority or trusted certification server.

"Mobility operator (MO)": One of entities within a PnC architecture that have a contractual relationship with an EV owner regarding charging, approval, and payment to enable an EV driver to charge an EV battery at a charging station. It may include at least one certification authority or certification server that issues and manages its own certificate.

"Charge service provider (CSP)": An entity responsible for managing and authenticating a credential of an EV user, and performing a role of providing billing and other value-added services to customers. It may correspond to a special type of MO, and may be implemented in a combined form with MO.

"Charging station (CS)": A facility or device that has one or more EV supply equipment and actually performs charging of an EV.

"Charging station operator (CSO)": An entity that is connected to a power grid and manages power in order to supply power requested by an EV. It may be a term of the same concept as a charge point operator (CPO) or an e-mobility service provider (eMSP), or it may be a term of a concept included in the CPO or eMSP or including the CPO or eMSP. The CSO, CPO or eMSP may include at least one certification authority that issues or manages its own certificate.

"e-mobility authentication identifier (eMAID)": A unique identifier that links a contract certificate to a payment account of an owner of an electromobility that uses electricity. In exemplary embodiments, the mobility authentication identifier may include an identifier of an EV certificate or an identifier of a provisioning certificate. The term eMAID may be replaced to refer to 'e-mobility account identifier' or may be replaced with a contract ID.

"Clearing house (CH)": An entity that handles cooperation matters between MOs, CSPs, and CSOs. It can act as an intermediary that facilitates approval, billing, and adjustment procedures for EV charging service roaming between two parties.

"Roaming": Information exchanges and a scheme and provisions between CSPs, which allows EV users to access the charging services provided by multiple CSPs or CSOs pertaining to multiple e-mobility networks by using a single credential and contract.

"Credential": A physical or digital asset representing an identity of an EV or EV owner, and may include a password used to verify the identity, a public key and private key pair used in a public key encryption algorithm, a public key certificate issued by a certification authority, information related to a trusted root certification authority.

"Certificate": An electronic document binding a public key to an ID by a digital signature.

"Service session": A collection of services around a charge point related to the charging of an EV assigned to a specific customer in a specific timeframe with a unique identifier.

Hereinafter, exemplary embodiments of the present disclosure will be explained in detail by referring to accompanying figures.

A method for pairing between an EVCC and an SECC for vehicle-to-grid (V2G) wireless power transfer (WPT) described in the present exemplary embodiments may be provided as a new WPT paring method which is capable of simplifying a pairing procedure by combining the pairing procedure with a fine positioning procedure using low-frequency (LF)-based point-to-point signal (P2PS) signaling performed in a V2G communication session, and is capable of efficiently preventing or resolving errors occurring frequently in the fine positioning procedure.

FIG. 1 is a diagram for schematically describing an overall configuration of a magnetic field (MF)-based WPT system to which a distance estimation method for WPT fine positioning according to an exemplary embodiment of the present disclosure is applicable.

As shown in FIG. 1, WPT for an electric vehicle (hereinafter, 'EV') 10 may be defined as a process of transferring an electric energy of a power grid G1 from a supply device to an EV device through a magnetic field in a state of magnetic induction or magnetic resonance without direct current flow through a galvanic connection. That is, the WPT may be used to charge a battery 30 of the EV 10 by transferring power from a charging station 20 to the EV 10.

The EV 10 may include an EV power circuit 150 having a secondary device electromagnetically coupled with a primary device within a supply power circuit 250 of the charging station 20. A secondary coil within the secondary device may receive electromagnetic energy from a primary coil of the primary device connected to the charging station 20 according to electromagnetic induction or magnetic resonance under control of an EVCC 100 of the EV 10. The electromagnetic energy transferred to the EV 10 may be converted into an induced current, and the induced current may be rectified into a DC current and then used to charge the battery 30.

The charging station 20 may receive power from the commercial power grid G1 or a power backbone and supply electromagnetic energy to the EV 10 through the supply power circuit 250 under control of an SECC 200 within the charging station 20. The supply power circuit 250 may be a component corresponding to at least part of an EVSE may be located in various places such as a garage or parking lot belonging to the home of the owner of the EV 10, a parking area for EV charging at a gas station, or a parking area at a shopping center or office building.

In addition, the charging station 20 may communicate with a power infrastructure management system, infrastructure server, or computing device on a network, which manages the power grid G1 through wired/wireless communication, and may perform wireless communication with the EV 10.

The wireless communication may include wireless LAN (WLAN)-based communication based on Wi-Fi according to the IEEE 802.11 protocol. In addition, the wireless communication may include point-to-point signal (P2PS) communication using LF signals and/or low power excitation (LPE) signals. In addition, the wireless communication scheme between the charging station 20 and the EV 10 may include one or more of various communication schemes such as Bluetooth, Zigbee, and cellular as well as the above-described communication schemes.

In addition, the EV 10 and the charging station 20 may perform WPT or a charging process by exchanging messages according to an extensible markup language (XML) or an efficient XML interchange (EXI) based data expression format. That is, communication for the charging process may be performed between an EVCC 100 and an SECC 200 through a wireless LAN or the like.

Meanwhile, if location information for fine positioning is not shared between the EVCC and the SECC through communication such as wireless LAN, it is not easy for the EV 10 or EV device equipped with the secondary device to normally perform the LF-based fine positioning procedure. However, according to the present exemplary embodiment, even when location information for fine positioning is not shared, information on a distance and direction of the secondary device from the primary device can be provided, so that the fine positioning can be normally performed based on the antenna information of each of the primary and secondary devices and responses to LF signals.

In addition, during a communication process for the charging process, the EV 10 may first verify an identity of the charging station 20 to identify whether it is a trusted facility or apparatus, and establish a secure channel with the SECC 20 of the charging station 20 to protect communication from unauthorized access. The secure channel may be established by a transport layer security (TLS). A TLS session may be performed according to a TLS session establishment procedure after an Internet protocol (IP)-based communication connection establishment procedure.

Figure 2:
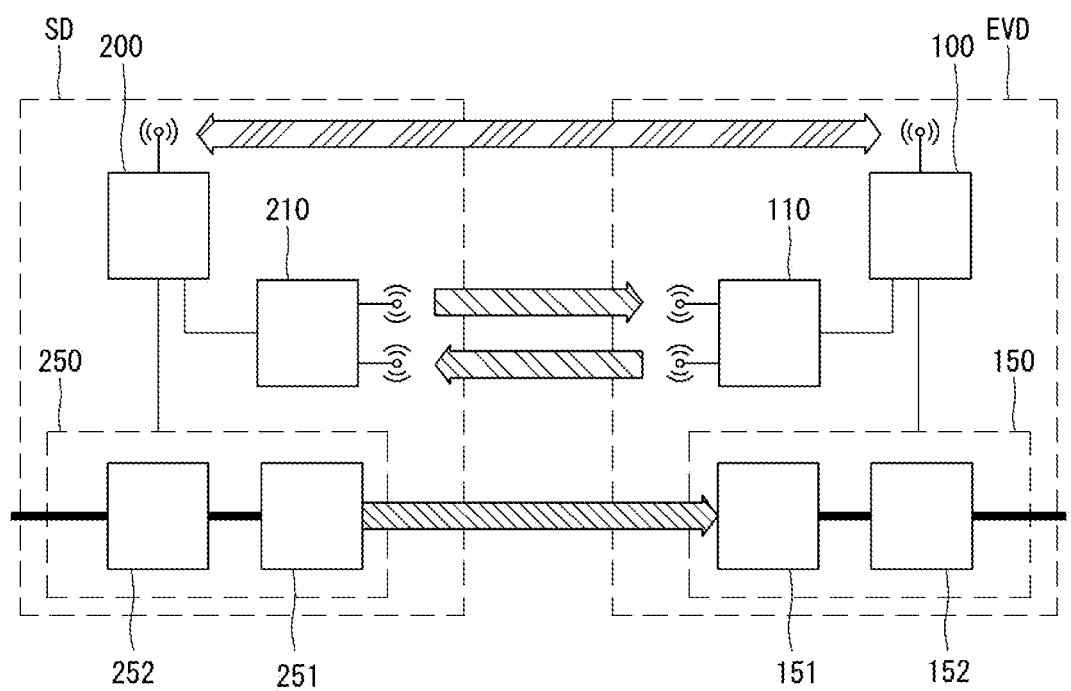
FIG. 2 is a diagram for describing a wireless power flow and communication interfaces between a supply device (SD) and an EV device (EVD) employable in the WPT system of FIG. 1.

FIG. 2 is a diagram for describing a wireless power flow and communication interfaces between a supply device (SD) and an EV device (EVD) employable in the WPT system of FIG. 1.

As shown in FIG. 2, in the wireless power flow between the SD and the EVD, supply power electronics 252 of the supply power circuit 250 may convert commercial power and transfer it to a primary device 251, the primary device 251 may transfer electromagnetic energy to a secondary device 151 of an EV power circuit 150 under control of the SECC 200, and power electronics 152 of the EV may convert an induced current generated in the secondary device 151 under control of the EVCC 110 and supply it to a battery or the like.

Communication between the EVCC 100 and the SECC 200 may be performed using a wireless local area network (WLAN) link supporting a physical layer and a data link layer of a wireless communication interface. In addition, in the communication between the EVCC 100 and the SECC 200, before initiating a WPT session, the SECC 200 and the EVCC 100 may perform analysis and confirmation for compatibility.

In the above-described WPT system, requirements for message exchange and communication security may be defined for compatibility analysis and confirmation in order to satisfy requirements of a compatibility class. The requirements for message exchange may include a communication timing requirement, an operation timing requirement, and the like.

In addition, the EVCC 100 and the SECC 200 may transmit and receive signals and data through P2PS signaling using an EV device P2PS controller 110 and a supply device P2PS controller 210. The P2PS may include LF signals. Each of the EV device P2PS controller 110 and the supply device P2PS controller 210 may have at least one or both of an LF transmitter including at least one antenna and an LF receiver including at least one antenna.

A plurality of LF transmitters connected to the EV device P2PS controller 110 may be arranged around a secondary coil of the secondary device, and may be referred to as transmission antennas or transmitters. A plurality of LF receivers connected to the supply device P2PS controller 210 may be arranged around a primary coil of the primary device, and may be referred to as reception antennas or receivers.

The physical layers for WLAN and P2PS signaling used for communication for WPT will be described as follows.

The system architecture with the physical layers for WLAN and P2PS signaling may consist of a WLAN between the EVCC and the SECC and a P2PS signaling between the EV device (EVD) and the supply device (SD). The P2PS signaling may be used for LF signals, low power excitation (LPE) from the primary device, anomaly monitoring by WPT, optical markings, external confirmation means, alignment, pairing or other means to ensure safety, power check, and/or the like.

Here, the LF signal is a digitally modulated magnetic field operating in a low-frequency radio band, for example, 30 kHz to 300 kHz. The LF transmitter or receiver may operate at a fixed frequency within a frequency range between 19 kHz and 300 kHz. The system frequency may be selected from 125 kHz, 134 kHz, 145 kHz, 165 kHz, 185 kHz, 205 kHz, or the like.

The maximum radiated power or magnetic or electric field strength for a specific frequency band used by the LF system may comply with the technical and operational parameters described in the SM.2153-7 report of the International Telecommunication Union Radiocommunication Sector (ITU-R) and information on national/regional rules on spectrum usage.

Different frequencies are needed to allow LF signals to position three EVs in parallel without interference. The magnetic field may be formed by two or more LF transmitters located in the EV or EV device. Since the locations of the LF transmitters are up to a manufacturer, the locations where the LF transmitters are mounted within the EV or EV device may not be specified.

Information on the locations of the antennas may be exchanged between the EVCC and the SECC through communication. The antenna may have directivity or orientation in a specific direction by concentrating or suppressing energy in a specific direction, and the direction of the LF signal of the transmitter of the primary device or EV transmitter may be predetermined or configured.

The primary device may include at least two LF receivers or transmitters. The manufacturer may arrange the LF transmitters or receivers symmetrically in the x-direction around a geometrical alignment point of the primary or secondary device, or mount the LF transmitters or receivers at a sufficient distance from a metal or ferrite structure of the primary device, thereby preventing serious interaction or interference.

The magnetic field strength may be measured by one or several receivers to provide positioning. Also, three or more antennas may be used to optimize the arrangement of the antennas.

Meanwhile, LF data of the LF signal transmitted from the EV or EV device (EVD) may be transmitted in an on-off-keying (OOK) scheme. In the OOK scheme, '1' may mean activation of the magnetic field and '0' may deactivation of the magnetic field.

The OOK scheme may be a simplest form of an amplitude shift keying (ASK) modulation scheme in which digital data is represented regardless of presence or absence of a carrier. The forming of the magnetic field may be highly dependent on a bandwidth (i.e., Q factor) of the coil. If the Q factor is too narrow, the receiver may not decode the data correctly. Thus, the Q factor may be adjusted to ensure proper data communication.

For example, as one of the results of adjusting the Q factor, a receiver detection threshold may be selected at 70% of an output current required as a coil current of the transmitter for detection of 0 to 1, and may be selected at 30% of the required output current for detection of 1 to 0.

In addition, a Manchester code may be used to encode a modulated signal of the LF data. A data rate of the Manchester code may be 3.9 Kbit/s (±300 b/s). Since the LF signal currently may use 6 frequencies as candidates, one period of data may be highly dependent on the frequency. That is, one period of data for each candidate frequency is shown in Table 1 below.

TABLE 1

| LF signals that can be used | | | | | | |
| --- | --- | --- | --- | --- | --- | --- |
| Frequency | 125 kHz | 134 kHz | 145 kHz | 165 kHz | 185 kHz | 205 kHz |
| Single value period | 8 μs | 7.5 μs | 6.9 μs | 6 μs | 5.4 μs | 4.9 μs |

An example of an LF data format for fine positioning is shown in Table 2 below.

TABLE 2

| Preamble Block | | Data Block | | | | |
| --- | --- | --- | --- | --- | --- | --- |
| Preamble | Sync. | First Data | CAC | Dummy | CRC | Guard |
| 8 bit | 9 bit | 1 bit | 32 bit | 2 bit | 2 bit | 2 bit |

In Table 2, a preamble signal of a preamble block is for a preamble detection circuit to identify an input signal in order to prevent a circuit from operating unintentionally in a noisy environment. An LF telegram may start with the preamble to configure an LF data threshold. The preamble may have a 50% duty cycle. In addition, a synchronization signal is a signal used for a ground assembly (GA) to demodulate the LF modulated signal transmitted from a vehicle assembly (VA).

In addition, first data of a data block may be fixed to '0'.

In addition, a collision avoidance code (CAC) may be a temporary identifier of each antenna for distinguishing signals from signals transmitted from other vehicles. The CAC for each antenna is randomly generated for every session and should be unique for each device. The length of the CAC may be chosen to be 32 bits to keep a probability of collision between antennas close to zero. For example, assuming that there are 6 vehicles and 4 antennas each, the maximum number of peripheral antennas may be given as 24. The CACs of the respective antennas may be delivered as ANT_ID parameters through vehicle communication controllers and a base communication controller. The data type of ANT_ID may be a string of 8 characters in a hexadecimal representation of the CAC.

In addition, the dummy may be one that does not contain useful data and has reserved space.

In addition, the cyclic redundancy check (CRC) may refer to a scheme of determining a check value for checking whether there is an error in transmitted data when the data is transmitted through a network or the like, or information on the scheme of determining such the check value.

In addition, when the LF transmitter transmits the LF signal to the LF receiver, the LF receiver may receive the data continuously. Accordingly, a previously transmitted signal and a currently transmitted signal may be distinguished using guard bits.

Meanwhile, the above-described P2PS signaling may be used for fine positioning, pairing, alignment check, and the like. The fine positioning procedure using the LF signals is as follows.

A start of the fine positioning procedure of the present exemplary embodiment may be triggered by transmitting a message from the EVCC to the SECC. The SECC may respond to the EVCC by transmitting a message including information on an LF operating frequency. The EV device may transmit an LF signal to the LF receiver of the primary device through a P2PS link at a selected frequency. The SECC may transmit to the EVCC a message including an RSSI value for the LF signal at the LF receiver of the primary device of the supply device (SD). A positioning algorithm based on the feedback of the RSSI value at the LF receiver of the primary device may be implemented in the EV. In this case, by using a distance estimation method according to the present exemplary embodiment, a distance between a center point of the EV device or a center point of the secondary device may be estimated based on a center point or a predetermined reference point of the primary device, and through this, the primary device and the secondary device may be automatically aligned within a tolerance range.

A more specific example of the above-described fine positioning procedure using LF signals will be described as follows.

First, the EVCC may request fine positioning using the LF signal. Then, the supply device (SD) may prepare the LF receivers to receive the LF signal from the EV device. Then, the SECC may respond to the EVCC by transmitting a message including information on the LF operating frequency of the SD. Then, the EV device may prepare to transmit the LF signal to the SD through the LF transmitters. Then, the LF transmitters may transmit the LF signal to the LF receivers using the information on the LF operating frequency of the SD.

When the driver moves the EV to a parking or charging spot and the secondary device arrives within at least 4 m from the primary device, the LF receivers may detect the LF signal transmitted from the EV device.

Then, the EV device may transmit the LF signal for positioning to the SD, and the EVCC may request a message including pre-calibrated raw data from the SECC. The SECC may respond to the EVCC with a message including pre-calibrated raw data obtained from LF signal values sensed by the SD.

Then, the EV device may dynamically calculate the position of the primary device based on the LF signal values returned from the SECC. In the present exemplary embodiment, the secondary device may be aligned on the primary device by moving the EV using the LF signal values (e.g., the maximum value of the LF signal and the arrival time of the LF signal) such that a condition that two distances from a center point of the primary device or two specific reference points on or near the top of the primary device to the two transmission antennas of the secondary device are equal is satisfied.

Then, if the secondary device is over the primary device within an alignment tolerance range and the primary device and the secondary device are in a good alignment state, the EV may park under control of a vehicle controller. Then, the EVCC may request the SECC to complete the fine positioning process, and the SD may respond to the EVCC by transmitting a message indicating that the LF receivers are no longer active without activating the LF receivers any longer.

In addition, the process of exchanging LF parameters in the above-described fine positioning procedure using LF signals will be described as follows.

First, at the start of LF-based fine positioning, in order to properly compare signals detected by the reception antennas of the primary device, information on the locations of the transmission antennas may be exchanged between the SECC and the EVCC through communication.

Here, the EVCC may transmit a fine positioning setup request message including data having preset parameters to the SECC. The parameters that may be included in the EV's LF fine positioning setup data may include the number of transmitters/receivers of an auxiliary antenna system mounted in the EV, identifiers of the respective transmitters/receivers, locations and directions of the respective transmitters/receivers, signal frequency, pulse sequence order, pulse separation time between individual pulses within a pulse package, time duration of each individual pulse, and package separation time between two consecutive pulse packages.

In addition, the SECC may transmit a fine positioning setup response message to the EVCC in response to the EVCC's fine positioning setup request message. The parameters that may be included in SECC's LF fine positioning setup data may include the number of transmitters/receivers of a fine positioning system installed in the primary device of the infrastructure, identifiers of the respective transmitters/receivers, locations and directions of the respective transmitters/receivers, signal frequency, pulse sequence order, pulse separation time between individual pulses within a pulse package, time duration of each individual pulse, and package separation time between two consecutive pulse packages.

The location of the transmitter or receiver described above may be represented by coordinates (x, y, z) of the transmitter or receiver, which are given based on coordinates of the primary device relative to a geometric center of the primary coil given in millimeters (mm). The direction of the transmitter or receiver may be represented by a (x, y, z) unit vector given a measurement direction, and all three values may be set to zero (0) if no direction is applied. The signal frequency may represent a frequency (Hz) of signals to be used by the EV device. The pulse sequence order, as an optional parameter, may represent an ordered list of antenna identifiers describing the order in which the transmitters or receivers transmit signals as one pulse package, and this list may define a package of pulses collected in the order of the pulses ordered at the EV transmitter or receiver.

After successfully completing the LF fine positioning setup, positioning information exchange between the EVCC and SECC may be initiated by the EVCC transmitting a fine positioning request message. Information on whether the positioning process is in progress or completed may be exchanged between the EVCC and the SECC, and additionally, specific parameters for the LF positioning scheme may be exchanged.

The specific parameters may include the number of signal packages included in a message, a package index of each signal package, an identifier of each transmitter or receiver, an effective isotropically radiated power (EIRP) of each transmitter, and a transmitter identifier and a received signal strength indicator (RSSI) value for a pulse or signal received at each receiver. The EIRP value representing a signal strength of the emitted LF signal is used as a transmitting component, otherwise the corresponding value may be set to zero. The RSSI value may include a pre-processed RSSI value of the received pulse, and the order of RSSI values may correspond to a sensor signal package order provided by the EV during the fine positioning setup.

Figure 3:
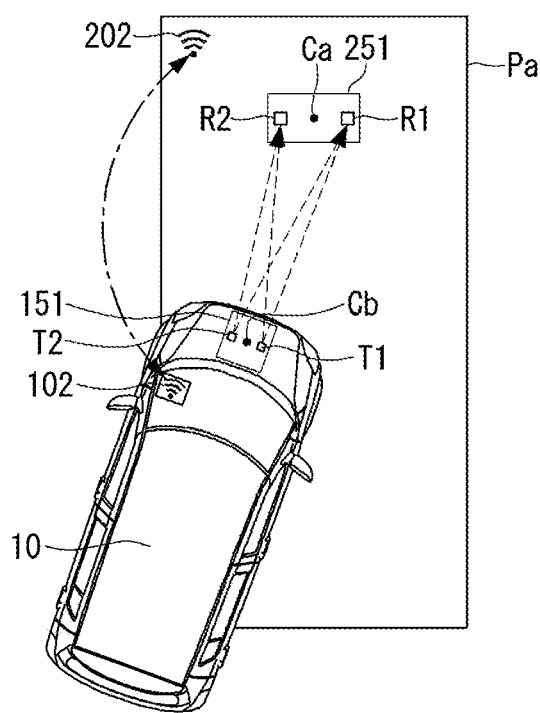
FIG. 3 is a diagram for describing an application environment of a distance estimation method for WPT fine positioning according to an exemplary embodiment of the present disclosure.

FIG. 3 is a diagram for describing an application environment of a distance estimation method for WPT fine positioning according to an exemplary embodiment of the present disclosure.

As shown in FIG. 3, a distance estimation method for fine positioning may be performed through a WLAN and an LF-based P2PS signaling between the EV 10 or EVD and the SD. The EVCC of the EVD 151 may share antenna-related information and LF signal-related information with the SECC of the SD through wireless LAN communication. The EVD may include a first communication device 102 connected to the EVCC, and the first communication device 102 may be connected to a second communication device 202 installed in a parking area Pa through a wireless LAN communication channel. The second communication device 202 may be connected to the SECC of the SD.

A first transmitter T1 and a second transmitter T2 may be arranged in a secondary device 151 of the EVD, and the secondary device may have an electromagnetic center or a geometric center Cb.

A primary device 251 may be included in the SD, have a first receiver R1 and a second receiver R2, and have an electromagnetic center or a geometric center Ca.

Meanwhile, unlike the first receiver R1 and the second receiver R2 fixed in the primary device 251 installed on the ground, the first transmitter T1 and the second transmitter T2 of the secondary device 151 of the EVD mounted on the moving EV 10 may have various arrangements according to the movement of the EV 10 with respect to the locations of the two receivers. In addition, when information on arrangement of the primary device or the LF antennas of the primary device is not possessed, it may not be easy to properly perform LF signal processing for fine positioning in a non-aligned state.

Therefore, in the present exemplary embodiment, provided is a distance estimation method for fine positioning having tolerant characteristics to an environment even when the locations of the first transmitter T1 and the second transmitter T2 mounted on the moving EV 10 vary, which does not require information on the arrangement of the primary device or the LF antennas of the primary device.

FIGS. 4A to 4D are diagrams for describing an arrangement structure of antennas of the primary device and antennas of the secondary device to which a distance estimation method for WPT fine positioning according to an exemplary embodiment of the present disclosure is applicable.

In the present exemplary embodiment, an LF antenna (LFA) may include an LF transmission antenna or transmitter for transmitting LF signals, or may include an LF reception antenna or receiver for receiving LF signals. The LF antenna may operate as a transmitter when transmitting LF signals and operate as a receiver when receiving LF signals.

As shown in FIGS. 4A to 4D, at least three LF antennas on the side of the EV device may be installed in a secondary device including a reception coil or secondary coil. The at least three LF antennas may be installed around the secondary coil as auxiliary antennas. For example, when the secondary coil has a shape with four sides on a plane, the at least three LF antennas may be arranged outside the middles of the respective sides of the secondary coil, such that the longitudinal directions of centers thereof are parallel to the respective sides for which the corresponding LF antennas are located.

In addition, at least three LF antennas on the side of the supply device may be installed in a primary device including a transmission coil or primary coil. The at least three LF antennas may be installed around the primary coil as auxiliary antennas. For example, when the primary coil has a shape with four sides on a plane, the at least three LF antennas may be arranged outside the middles of the respective sides of the primary coil, such that the longitudinal directions of centers thereof are parallel to the respective sides for which the corresponding LF antennas are located.

Figure 4A:
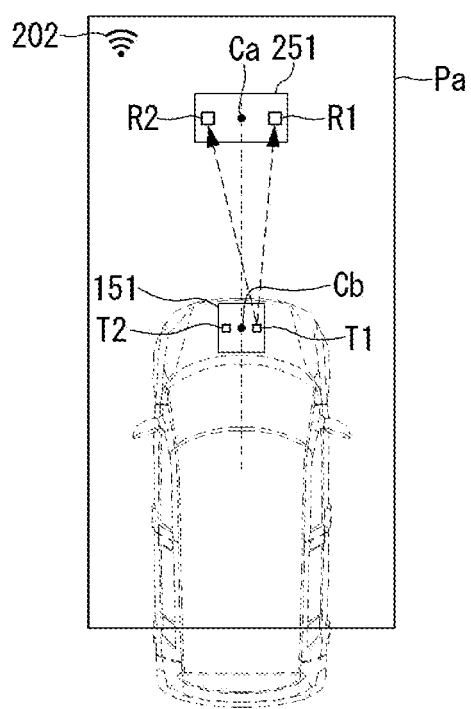
FIGS. 4A to 4D are diagrams for describing an arrangement structure of antennas of the primary device and antennas of the secondary device to which a distance estimation method for WPT fine positioning according to an exemplary embodiment of the present disclosure is applicable.

More specifically, as in the first arrangement structure shown in FIG. 4A, when three receivers are arranged in the primary device, a first receiver (i.e., LFA 1A) may be symmetrically arranged with a second receiver (i.e., LFA 1B), and a third receiver (i.e., LFA 1C) may be arranged in the (−x) direction parallel to a surface of a paper and directed toward an upper side of the paper among directions orthogonal to a straight line passing through centers of the first receiver (i.e., LFA 1A) and the second receiver (i.e., LFA 1B).

Similarly, when three transmitters are arranged in the secondary device, a first transmitter (i.e., LFA 2A) may be symmetrically arranged with a second transmitter (i.e., LFA 2B), and a third transmitter (i.e., LAF 2C) may be arranged in the (−x) direction parallel to a surface of a paper and directed toward an upper side of the paper among directions orthogonal to a straight line passing through centers of the first transmitter (i.e., LFA 2A) and the second transmitted (i.e., LFA 2B).

Figure 4B:
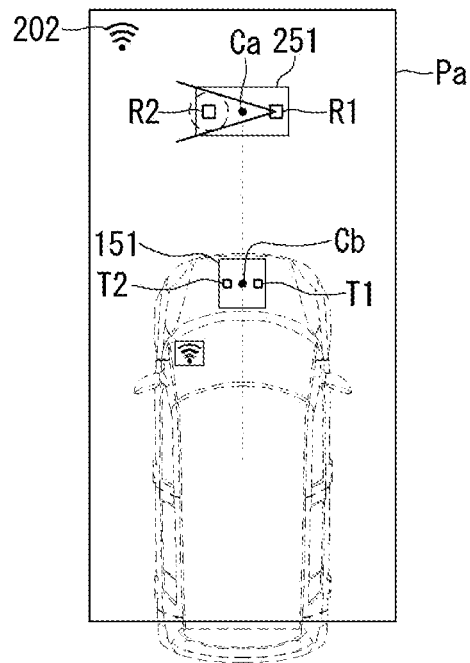

In addition, as in the second arrangement structure shown in FIG. 4B, in the primary device, a first receiver (i.e., LFA 1A) may be symmetrically arranged with a second receiver (i.e., LFA 1B), and a third receiver (i.e., LAF 1C) may be arranged in the (−x) direction. In the secondary device, a first transmitter (i.e., LFA 2A) may be symmetrically arranged with a second transmitter (i.e., LFA 2B), and a third transmitter (i.e., LAF 2C) may be arranged in the x direction. The x direction may be a reverse of the (−x) direction.

Figure 4C:
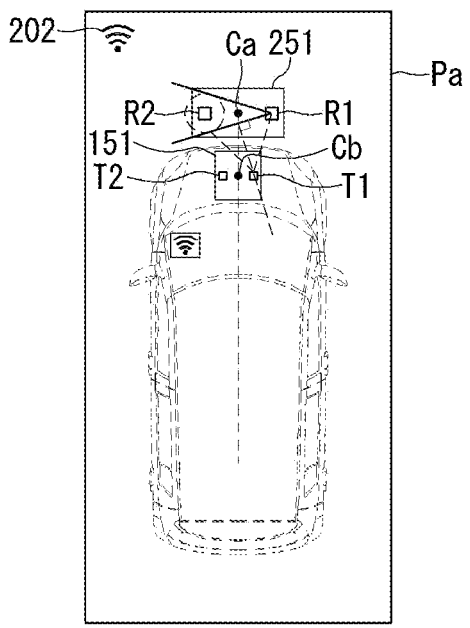

In addition, as in the third arrangement structure shown in FIG. 4C, in the primary device, a first receiver (i.e., LFA 1A) may be symmetrically arranged with a second receiver (i.e., LFA 1B), and a third receiver (i.e., LAF 1C) may be arranged in the x direction. In the secondary device, a first transmitter (i.e., LFA 2A) may be symmetrically arranged with a second transmitter (i.e., LFA 2B), and a third transmitter (i.e., LAF 2C) may be arranged in the (−x) direction.

Figure 4D:
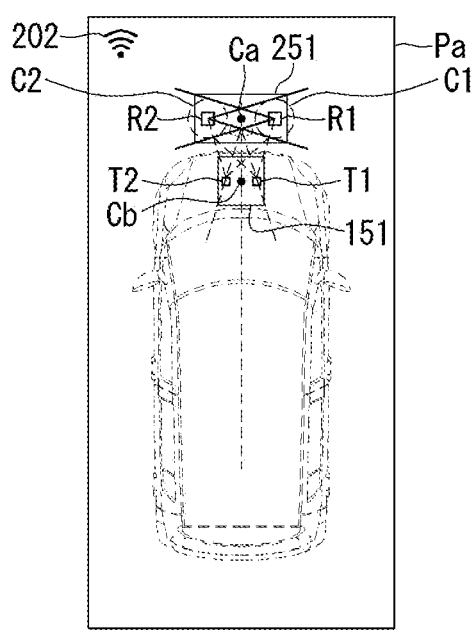

In addition, as in the fourth arrangement structure shown in FIG. 4D, in the primary device, a first receiver (i.e., LFA 1A) may be symmetrically arranged with a second receiver (i.e., LFA 1B), and a third receiver (i.e., LAF 1C) may be arranged in the x direction. In the secondary device, a first transmitter (i.e., LFA 2A) may be symmetrically arranged with a second transmitter (i.e., LFA 2B), and a third transmitter (i.e., LAF 2C) may be arranged in the x direction.

Here, the LF antenna including one or more transmitters and one or more receivers may be arranged such that each magnetic field is formed in a direction of 0 degrees, 90 degrees, 180 degrees, or 270 degrees.

Meanwhile, among various positioning technologies, an RSSI-based method may be mentioned as a representative positioning technology that can be used for LF signal-based fine positioning of EV WPT.

The RSSI-based distance estimation may be expressed according to Equation 1 below.

$$d = 10^{\frac{-RSSI + Ar}{10^n}} \text{ or } d = \frac{\lambda}{4\pi} \cdot 10^{\frac{L}{20}} = \frac{c}{4\pi f} \cdot 10^{\frac{L}{20}} \quad \text{[Equation 1]}$$

Here, d may denote a distance, n may denote a signal propagation constant, Ar may denote an RSSI value per meter, λ may denote a wavelength of a radio wave, c may denote a speed of a radio wave, f may denote a frequency of the radio wave, and L may denote a propagation path loss, that is, a value obtained by subtracting a strength of a received signal from a strength of a transmitted signal.

To recognize 3D coordinates through the RSSI-based scheme, it is necessary to recognize at least three signals. At least three LF transmitters may be arranged in the reception coil, and at least three LF receivers may be arranged in the transmission coil.

Meanwhile, in the present exemplary embodiment, two transmitters among at least three or more transmitters of the EV device and two receivers among at least three or more receivers of the primary device may be used, and the fine positioning may be performed by estimating a distance and a direction of a center point of the secondary device with respect to a center point of the primary device using LF signals.

FIGS. 5A to 5D are diagrams for describing a process performed in a state in which the primary device and the secondary device to which a distance estimation method for WPT fine positioning according to an exemplary embodiment of the present disclosure is applicable.

As shown in FIGS. 5A to 5D, the distance estimation method for fine positioning may be performed when the primary device and the secondary device are in an aligned state or a semi-aligned state by the EV or EV device, a distance estimation device coupled thereto, a vehicle controller, or a vehicle computing device. The semi-aligned state may include a state in which a center point Cb of the secondary device 151 to which the first transmitter T1 and the second transmitter T2 are combined and a center point Ca of the primary device 251 to which the first receiver R1 and the second receiver R2 are combined are aligned in a line within a tolerance range.

First, as shown in FIG. 5A, in the distance estimation method for fine positioning, a signal may be transmitted to the two receivers R1 and R2 through the first transmitter T1 disposed around the secondary device 151 of the vehicle. Based on a difference in reception times of the LF signal received at the two receivers R1 and R2, a first distance between the first transmitter T1 and the first receiver R1 and a second distance between the first transmitter T1 and the second receivers R2 may be calculated respectively.

Figure 5B:
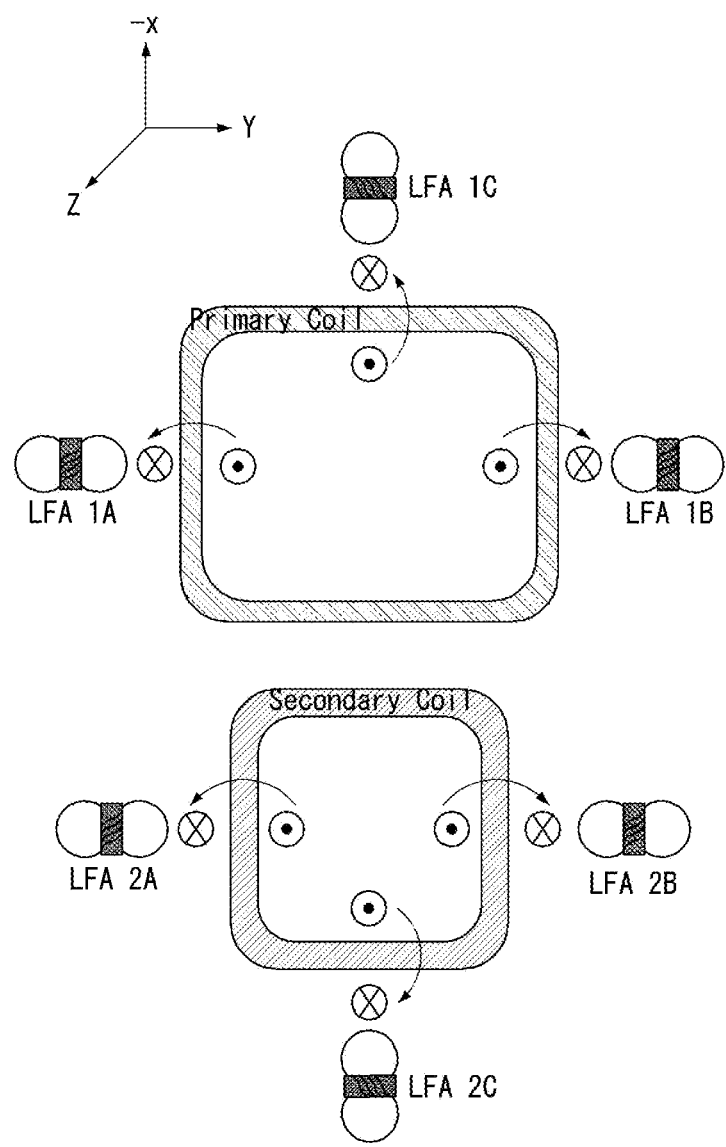

As shown in FIG. 5B, in the distance estimation method for fine positioning, a first circle having a radius of half of a difference (distance difference) between the calculated first and second distances may be formed with the second receiver R2 as a center, and a first tangent line passing through the center of the first receiver R1 and meeting the first circle may be formed. The second receiver R2 may be a receiver that is relatively far from the first transmitter T1 among the two receivers.

Figure 5C:
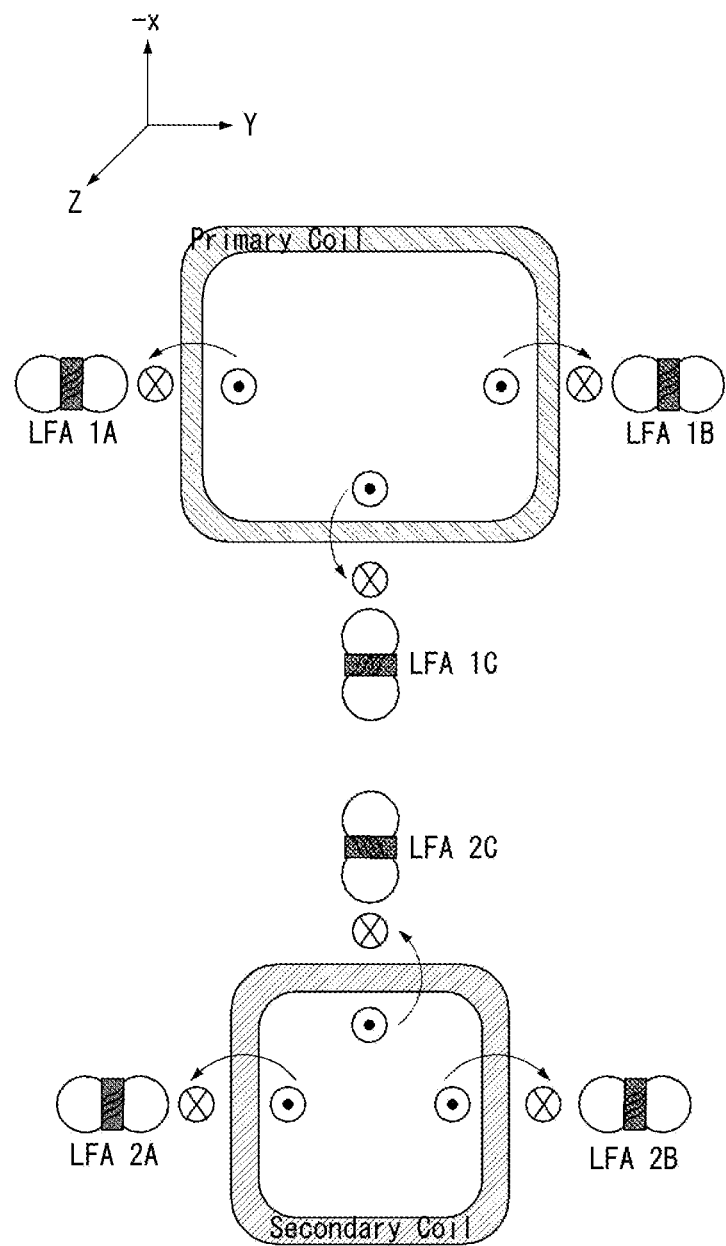

As shown in FIG. 5C, in the distance estimation method for fine positioning, a first normal line passing through the center of the first transmitter T1 may be formed on a first tangent line component between a point where the first circle and the first tangent line meet and the center of the first receiver R1. The first normal line may have a first start point on the first tangent line component.

As shown in FIG. 5D, in the distance estimation method for fine positioning, similarly to the case of the first transmitter T1, with respect to the second transmitter T2, a second circle having a radius of half of a second distance difference corresponding to a signal difference for a second LF signal may be formed with the first receiver R1 as a center, a second tangent line passing through the center of the second receiver R2 and meeting the second circle may be formed, and a second normal line passing the center of the second transmitter T2 may be formed on a second tangent line component between a point which the second circle and the second tangent line meet and the center of the second receive R2. The second normal line may have a second start point on the second tangent line component.

Then, when the locations of the two receivers are known, the distance estimation device performing the distance estimation method for fine positioning may specify coordinates where each normal line and each circle meet using a geometry.

In addition, since the two transmitters should be located at the same distance from the two start points, it can be seen that vertexes of an isosceles triangle having the two points as a base is the locations of the transmitters. The vertexes of the isosceles triangle may move along a line segment perpendicular to the center of the base. Therefore, if a line is drawn perpendicular to the center of the line segment connecting the two points, the transmitter should be located on the line segment.

Then, assuming that the distance between the first transmitter T1 and the second transmitter T2 is known, the distance estimation device may calculate the distance to the first transmitter T1 by configuring the distance between the first start point and the first transmitter T1 on the first normal line to be the same as the distance between the second start point and the second transmitter T2 on the second normal line.

According to the present exemplary embodiment, when the distance on the first normal line and the second normal line is equal to the distance between the two transmitters, the position of the center of the secondary device 151 in which the two transmitters are combined may be determined from the coordinates of the two transmitters, and the distance to the center point of the primary device may be calculated.

Figure 6:
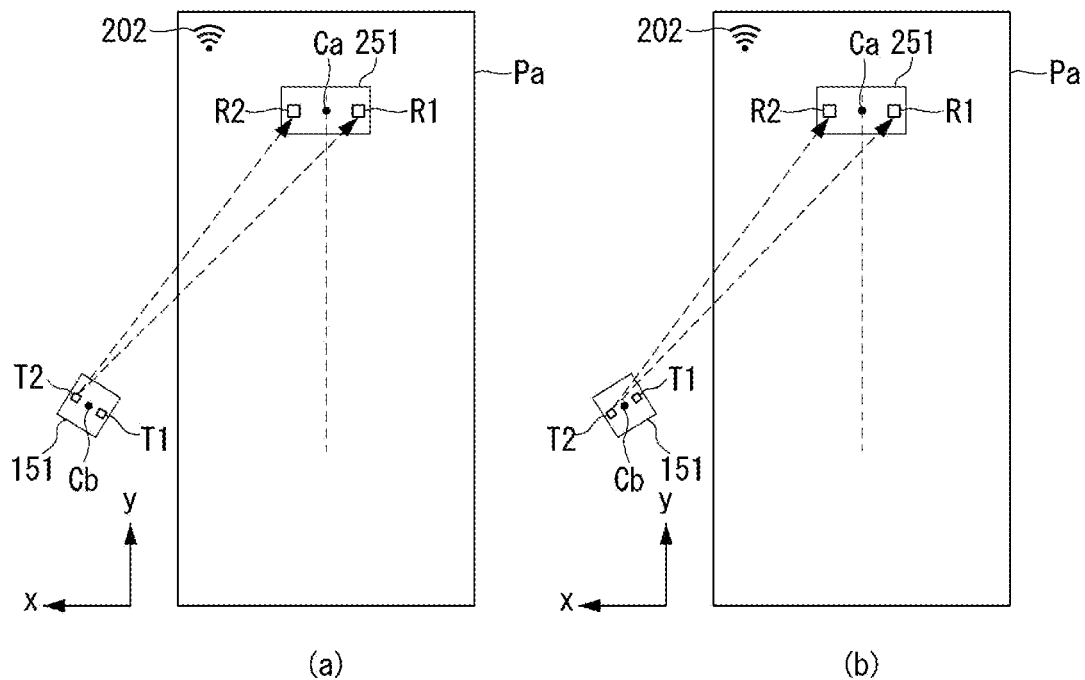
FIGS. 6 and 7 are diagrams illustrating a state in which the primary device and the secondary device to which a distance estimation method for WPT fine positioning according to an exemplary embodiment of the present disclosure is applicable are not aligned.
Figure 7:
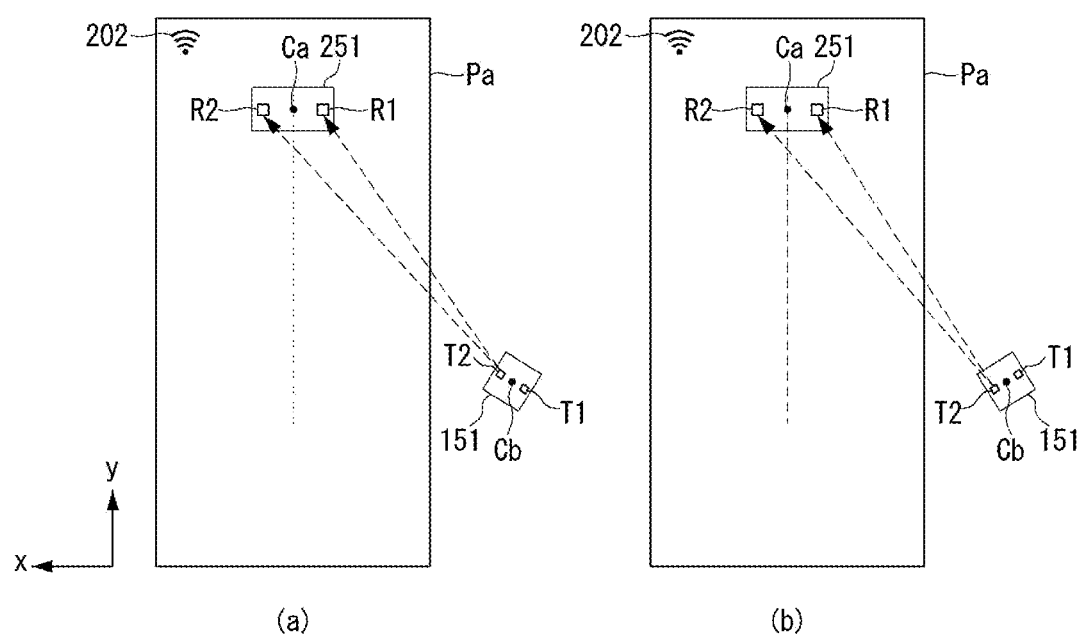

FIGS. 6 and 7 are diagrams illustrating a state in which the primary device and the secondary device to which a distance estimation method for WPT fine positioning according to an exemplary embodiment of the present disclosure is applicable are not aligned.

Referring to (a) and (b) of FIG. 6, the secondary device 151 of the EV device may be positioned on the left side of the primary device 251. In addition, a front side of the EV equipped with the secondary device 151 may be positioned to face a direction in which the primary device 251 is located at a first time (see (a) of FIG. 6), and may be positioned to face a point far left away from the primary device 251 so that the primary device 251 is positioned on the right side of the EV at a second time (see (b) of FIG. 6).

Referring to (a) and (b) of FIG. 7, the secondary device 151 of the EV device may be positioned on the right side of the primary device 251. In addition, a front side of the EV equipped with the secondary device 151 may be positioned to face a point far right away from the primary device 251 so that the primary device 251 is located on the left side of the EV at a third time (see (a) of FIG. 7), and may be positioned to face a direction in which the primary device 251 is located at a fourth time (see (b) of FIG. 7).

As described above, in the distance estimation method for fine positioning according to the present exemplary embodiment, even when there is no information on the antenna arrangement structure of the primary device 251, the distance and direction of each of the two transmitters with respect to the two receivers may be effectively estimated using the LF signals, and thus the center Cb of the secondary device 151 may be aligned with the center Ca of the primary device 251.

Figure 8:
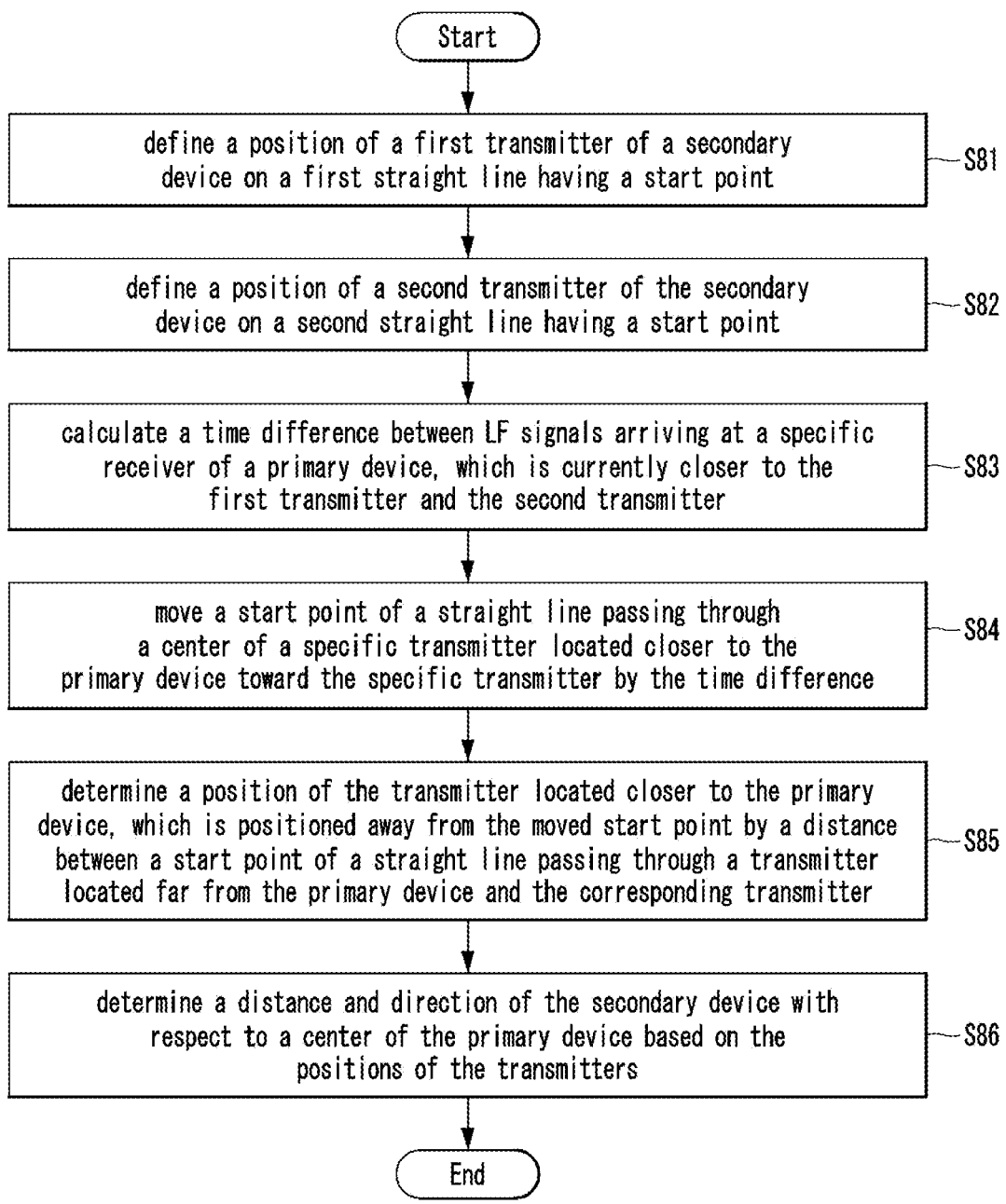
FIG. 8 is a flowchart illustrating a distance estimation method for WPT fine positioning applied to the misalignment state of FIGS. 6 and 7.

FIG. 8 is a flowchart illustrating a distance estimation method for WPT fine positioning applied to the misalignment state of FIGS. 6 and 7.

As shown in FIG. 8, the distance estimation method for fine positioning may be performed by the EV or EVD having the EVCC connected with the SECC of the SD through a WLAN and having the secondary device equipped with the first transmitter and the second transmitter.

In the distance estimation method of fine positioning, first, a first LF signal may be transmitted, through the first transmitter, to the first receiver and the second receiver of the primary device of the SD, and a position of the first transmitter may be defined on a first straight line extending in a radial direction from a reference point on the SD based on receiving a response related to the first LF signal from the SECC.

In addition, in the distance estimation method of fine positioning, a second LF signal may be transmitted, through the second transmitter, to the first receiver and the second receiver, and a position of the second transmitter may be defined on a second straight line extending in a radial direction from a reference point on the SD based on receiving a response related to the second LF signal from the SECC.

Each of the first straight line and the second straight line is a straight line having a start point at one end thereof, and each extension from the start point may be formed to pass through a center point of the primary device. The center point of the primary device may be a center point between a plurality of LF receivers installed in the primary device or a geometric center point of the primary device. Of course, in the present disclosure, the center point of the primary device is not limited to the above-described configuration, and may be an arbitrary position calculated from at least one LF receiver or a specific position arbitrarily designated on the primary device. Accordingly, the center point of the primary device may be used as a reference point for the distance estimation method of the present exemplary embodiment, and may be referred to as the 'reference point' in this sense.

The start point of the first straight line may be a midpoint of the first tangent line component and may be formed at a point meeting a normal line of the first transmitter. Similarly, the start point of the second straight line may be a midpoint of the second tangent line component and may be formed at a point meeting the second normal line passing through the center of the second transmitter. The start points, tangent line components, and normal lines will be described in detail below.

Then, the EV or EVD may calculate a time difference between the first LF signal and the second LF signal arriving at a specific receiver closer to the first transmitter and the second transmitter (S83). The time difference between the first LF signal and the second LF signal may be converted into a distance difference between the first LF signal and the second LF signal by multiplying a speed of light thereto. Here, the EV or EVD may include a distance estimation device or a vehicle controller including a means or component that performs the same function as the distance estimation device.

Then, the EV or EVD may move a start point of a straight line passing through a center of a specific transmitter located closer to the primary device toward the specific transmitter correspondingly to the time difference or by the distance difference calculated based on the above-described time difference (S84).

According to the movement of the start point described above, a distance from the center of each of the two transmitters to the corresponding start point may be set to be the same. One of the corresponding start points may a start point moved by the above-described distance difference.

Then, when the transmitter located closer to the primary device is the first transmitter, the EV or EVD may determine a first-a start point obtained by moving the first start point of the first straight line toward the first transmitter by the time difference on the first straight line, and determine the position of the first transmitter which is positioned away from the first-a start point on the first straight line by the same distance as the distance between the second start point on the second straight line and the second transmitter (refer to S85).

In addition, when the transmitter located closer to the primary device is the second transmitter, the EV or EVD may determine a second-a start point obtained by moving the second start point of the second straight line toward the second transmitter by the time difference on the second straight line, and determine the position of the second transmitter which is positioned away from the second-a start point on the second straight line by the same distance as the distance between the first start point on the first straight line and the first transmitter (refer to S85).

Then, the EV or EV device may estimates the distance and direction of the center or center point of the secondary device with respect to the center or center point of the primary device based on the determined positions of the two transmitters (S86), and may perform LF-based fine positioning based thereon. The center or center point of the secondary device may be, but is not limited to, a midpoint of a straight line component connecting the center of the first transmitter and the center of the second transmitter.

According to the present exemplary embodiment, two LF antennas among at least three LF antennas disposed in the primary device may be used as the first receiver and the second receiver, and two LF antennas of at least three LF antennas disposed in the secondary device may be used as the first transmitter and the second transmitter.

Here, the first receiver and the second receiver may disposed on a straight line passing through the center point of the primary device, disposed on a straight line parallel to one side of the primary device, or disposed in arbitrary positions without needing to be arranged in a point-symmetrical or line-symmetrical manner with respect to the center point of the primary device. In addition, the first transmitter and the second transmitter may also be disposed on a straight line passing through the center point of the secondary device, disposed on a straight line parallel to one side of the secondary device, or disposed in arbitrary positions without needing to be arranged in a point-symmetrical or line-symmetrical manner with respect to the center point of the secondary device.

FIGS. 9 to 17 are exemplary diagrams for describing the distance estimation method for WPT fine positioning of FIG. 8 in more detail.

In the distance estimation method for fine positioning of the present exemplary embodiment, information on LF reception antennas (Rx LFAs) installed in the primary device (PD) of the GA or SD of the EVSE may be obtained through WLAN communication such as WiFi communication between the EVCC and the SECC. The information on Rx LFAs may include information of locations of two antennas among three or more antennas mounted on the SD, and the information on the locations of the two Rx LFAs may be exchanged between the EVCC and the SECC through communication.

Figure 9:
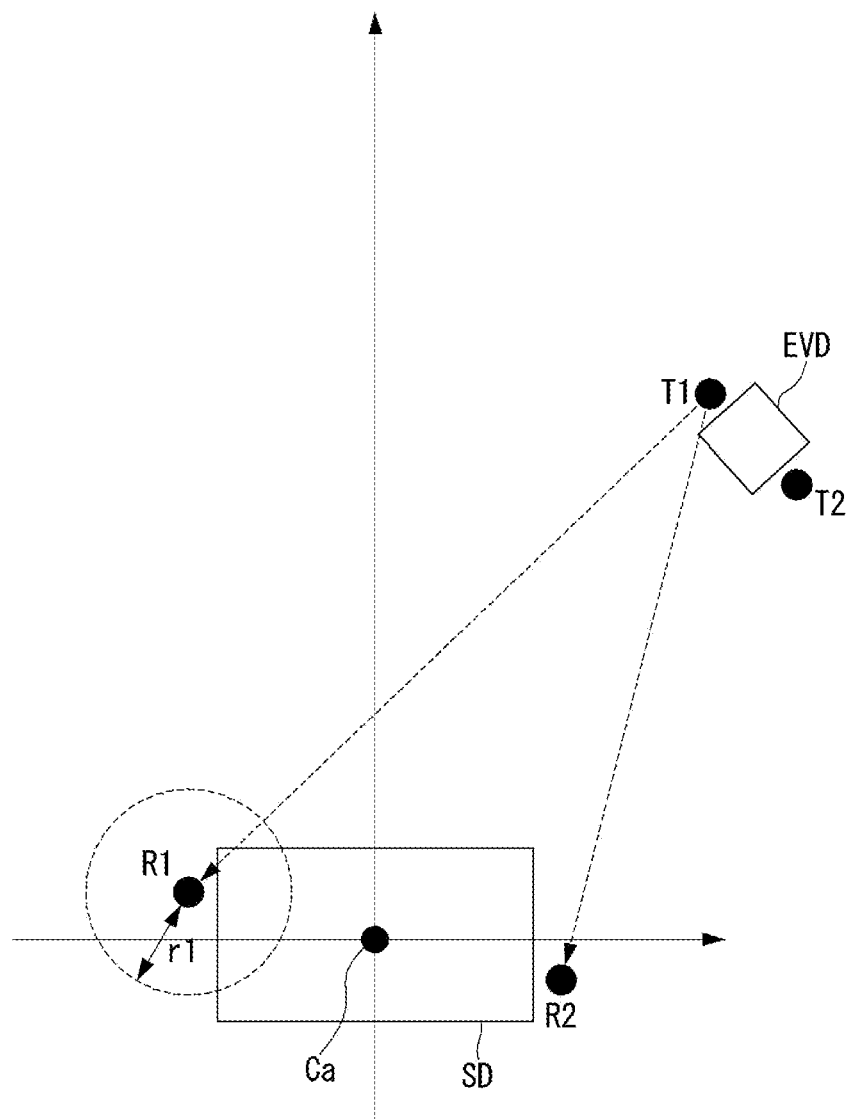
FIGS. 9 to 17 are exemplary diagrams for describing the distance estimation method for WPT fine positioning of FIG. 8 in more detail.

As shown in FIG. 9, a first transmission LF antenna (Tx LFA) among a plurality of Tx LFAs (hereinafter, simply referred to as 'first transmitter') installed in the VA of the EV or EVD may transmit an LF signal to a first Rx LFA (hereinafter referred to as 'first receiver') and a second Rx LFA (hereinafter referred to as 'second receiver') installed in the PD.

Here, the first transmitter may include one of three or more antennas mounted on the EVD. At least one pair of three or more antennas mounted on the EVD may be arranged in a point-symmetrical or line-symmetrical manner, but the arrangement of three or more antennas of the present disclosure is not limited thereto, and may include three or more transmission antennas arranged in arbitrary positions.

In addition, the first receiver and the second receiver may include two of three or more antennas mounted on the SD. At least one pair of the three of more antennas mounted on the SD may be arranged in a point-symmetrical or line-symmetrical manner, but the arrangement of the three or more antennas of the present disclosure is not limited thereto, and may include three or more reception antennas arranged in arbitrary positions.

Meanwhile, the present exemplary embodiment will be described, for convenience of illustration and description, based on a form in which only two antennas are disposed in each of the primary device and the secondary device. Here, each antenna may be a dedicated receiver for receiving LF signals or a dedicated transmitter for transmitting LF signals. Further, each antenna may be configured to operate as at least part of an LF transmitter when transmitting LF signals and as at least part of an LF receiver when receiving LF signals. In the present exemplary embodiment, each of the two antennas of the primary device may be a receiver or may operate as a receiver, and each of the two antennas of the secondary device may be a transmitter or may operate as a transmitter.

In the present exemplary embodiment, the position of the first transmitter T1 may be denoted as (x1, y1), the position of the second transmitter T2 may be denoted as (x2, y2), the position of the first receiver R1 may be denoted as (a, b), and the position of the second receiver R2 may be denoted as (c, d). Here, variables a, b, c, and d related to the position of the first receiver R1 and the position of the second receiver R2 may be obtained from a manufacturer or the like.

Figure 10:
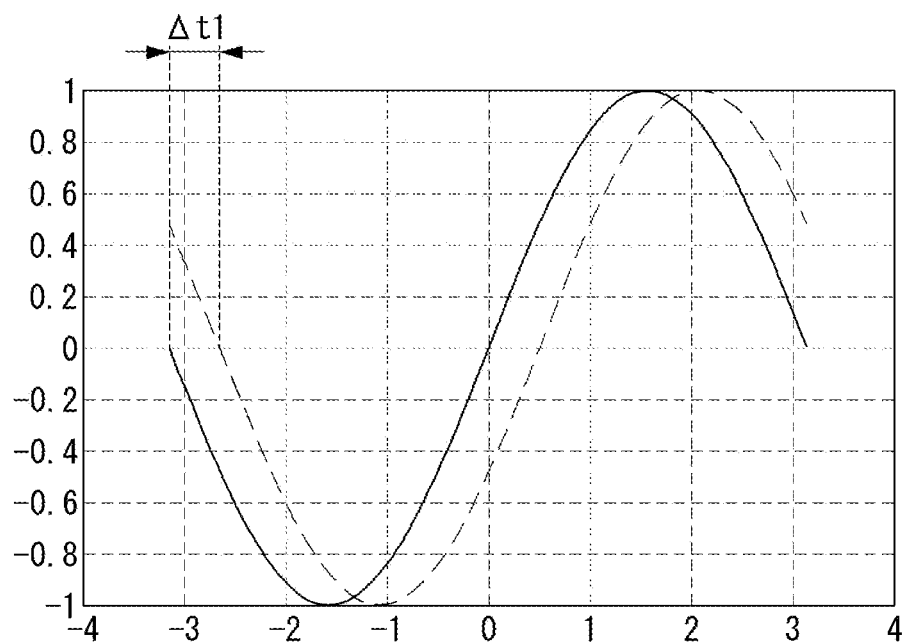

Since the first distance between the first receiver R1 and the first transmitter T1 is different from the second distance between the second receiver R2 and the first transmitter T1, signals received at the first receiver R1 and the second receiver R2 may have a first time difference Δt1. An example of the time difference Δt1 may be as shown in FIG. 10.

Since the time difference corresponds to a difference between propagation times of the electromagnetic wave with respect to the distance through which the signal is transmitted, a first distance difference r1 between the first distance and the second distance may be calculated by multiplying the time difference by a speed of light. A circle having a half of the first distance difference as a radius may be drawn with the first receiver R1 as a center.

Figure 11:
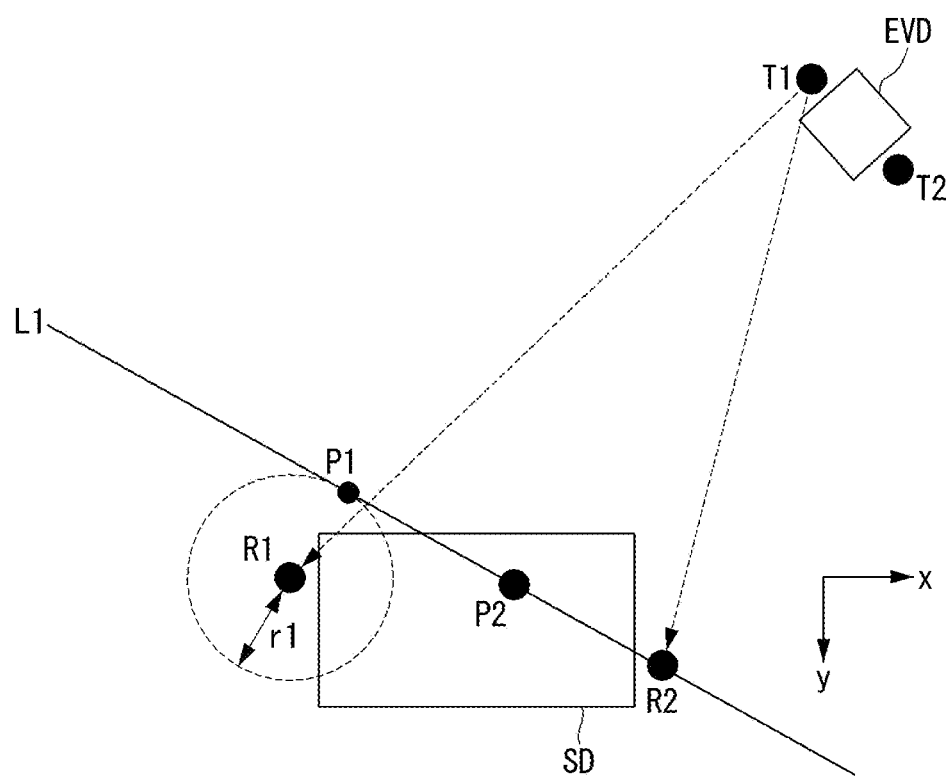

As shown in FIG. 11, a first circle having a first radius may be formed with the first transmitter R1 located relatively far from the first transmitter T1 as a center. The first radius may correspond to a half of the first distance difference r1. That is, a diameter of the first circle may correspond to the first distance difference.

Figure 12:
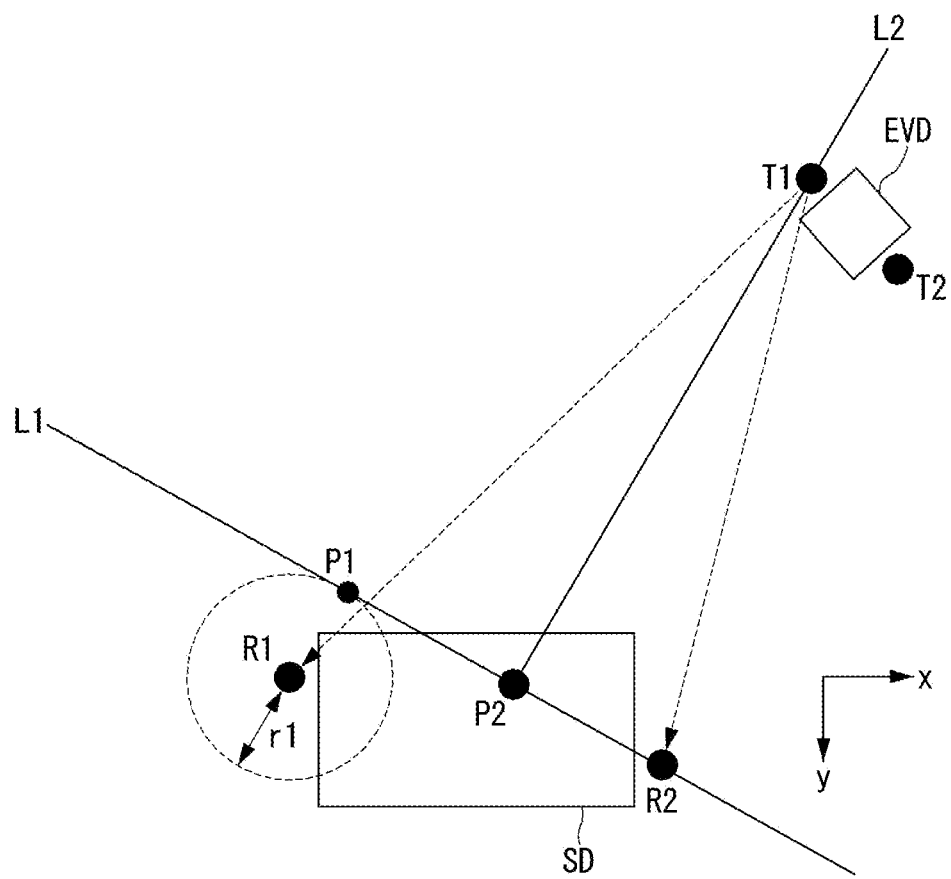

As shown in FIG. 12, a first tangent line L1 passing through a center of a receiver located relatively close to the first transmitter T1 (i.e., second receiver R2 in FIG. 12) and meeting the first circle may be formed. A position of a first point P1 on the first circle where the first tangent line L1 meets the first circle may be denoted as (e, f). The first tangent line L1 may be a line closer to the EVD among two tangent lines passing through the center of the second receiver R2 and meeting the first circle.

The aforementioned center of the receiver or the transmitter may be a geometric center of the antenna. However, without being limited thereto, it may be an arbitrary position configured on the antenna.

Then, a first normal line L2, which is a straight line passing through the center of the first transmitter T1 and meeting the first tangent line L1 as a normal line, may be defined. A second point P2 where the first normal line L2 and the first tangent line L1 meet may be a center point of a first tangent line component connecting the first point P1 and the second receiver R2. The first normal line L2 may be a straight line starting at the second point. The position of the second point P2 may be denoted as (g, h).

The above-described relationship may be expressed by Equations 2 and 3 below.

$$(e-a)^2+(f-b)^2=r1^2 \quad \text{[Equation 2]}$$

$$(e-a)(c-a)+(f-b)(d-b)=r1^2 \quad \text{[Equation 3]}$$

In Equations 2 and 3, the position (e, f) of the first point represents the coordinates of the first point on the first tangent line L1, and r1 represents the first distance difference.

According to the configuration described above, an equation of a straight line with respect to the first normal line L2 connecting the first transmitter T1 and the second point P2 may be obtained. The first normal line L2 may have the second point P2 as a start point of the straight line, and define the position where the first transmitter T1 can be located on the first straight line L2. The first normal line L2 may be referred to as a 'first straight line'.

An equation of a straight line for the first normal line L2 perpendicular to the first tangent line L1 passing through the second point P2 and the second receiver R2 may be expressed as Equation 4 below.

$$y-f = \frac{d-f}{c-e}(x-e) \quad \text{[Equation 4]}$$

The position of the first transmitter T1 may be a point on the equation of the straight line expressed by Equation 4. That is, by using the equation of the first normal line L2 perpendicular to the first tangent line L1 with the second point P2 as a start point, the distances from points existing on the first normal line L2 and the second point P2 may be obtained.

Figure 13:
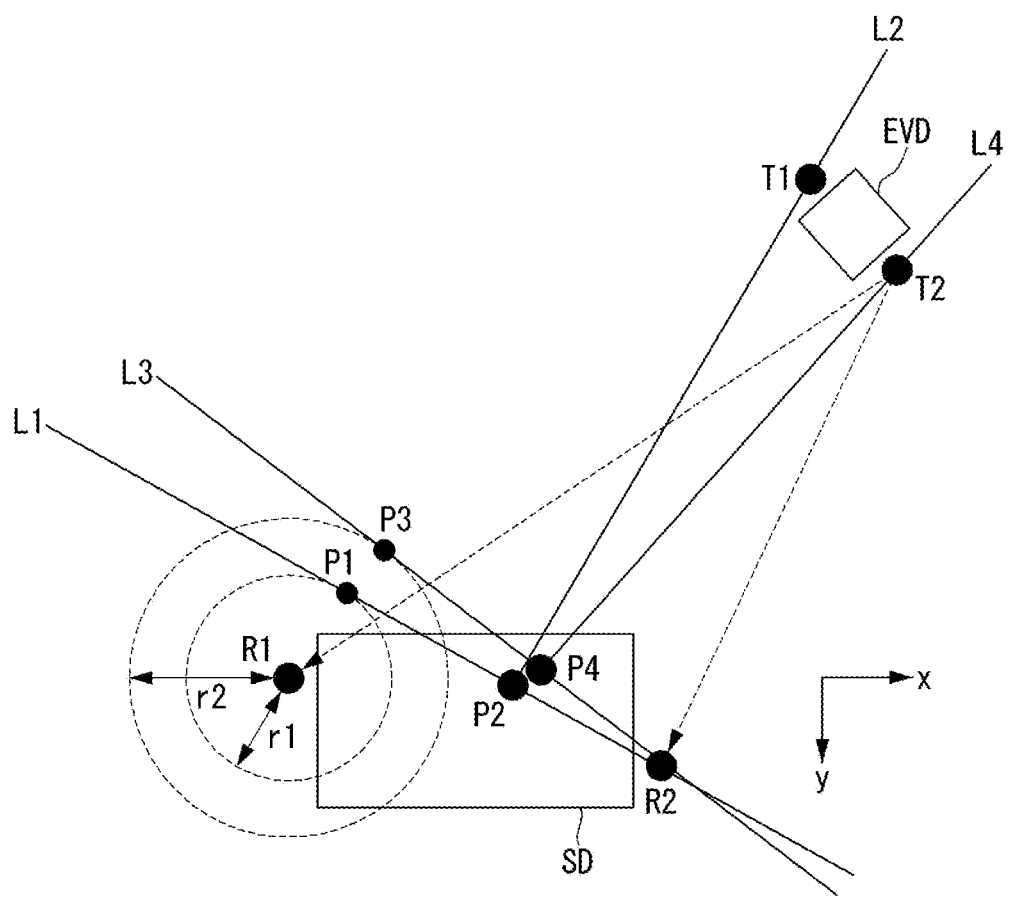

As shown in FIG. 13, the same procedure as that for the first transmitter T1 may be performed so that a second circle having a second radius r2 with the second transmitter T2 as a center may be formed, a second tangent line L3 meeting the second circle at a third point P3 and passing through the second receiver R2 may be formed, and a second normal line L4 perpendicular to the second tangent line L3 may be formed.

An equation of a straight line of the second normal line L4 perpendicular to the second tangent line L3 and meeting a fourth point P4 on the second tangent line L3 may be calculated. The fourth point P4 may be a center point of a second straight line component between the second receiver R2 and the third point P3, and the position of the fourth point P4 may be denoted as (k, l).

The equation of the straight line with respect to the second normal line L4 may be expressed as Equation 5.

$$y-l = \frac{c-i}{d-j}(x-k) \quad \text{[Equation 5]}$$

The position of the second transmitter T2 may be a point on the equation of the straight line expressed by Equation 5. That is, by using the equation of the second normal line L4 perpendicular to the second tangent line L2 with the fourth point P4 as a start point, distances between points existing on the second normal line L4 and the fourth point P4 may be obtained.

Meanwhile, in order to solve the two equations of straight lines for each normal line simultaneously, that is, to obtain a distance estimation solution for fine positioning that is tolerant of the antenna arrangement structure, the distance between the remaining transmitter and the start point may be adjusted according to a distance between the transmitter with a relatively short distance and the start point.

Figure 14:
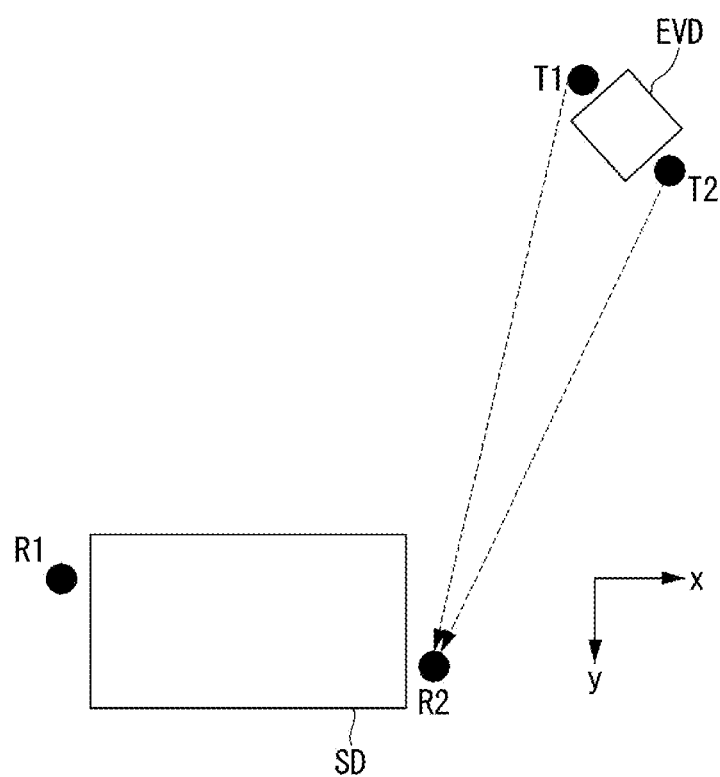
Figure 15:
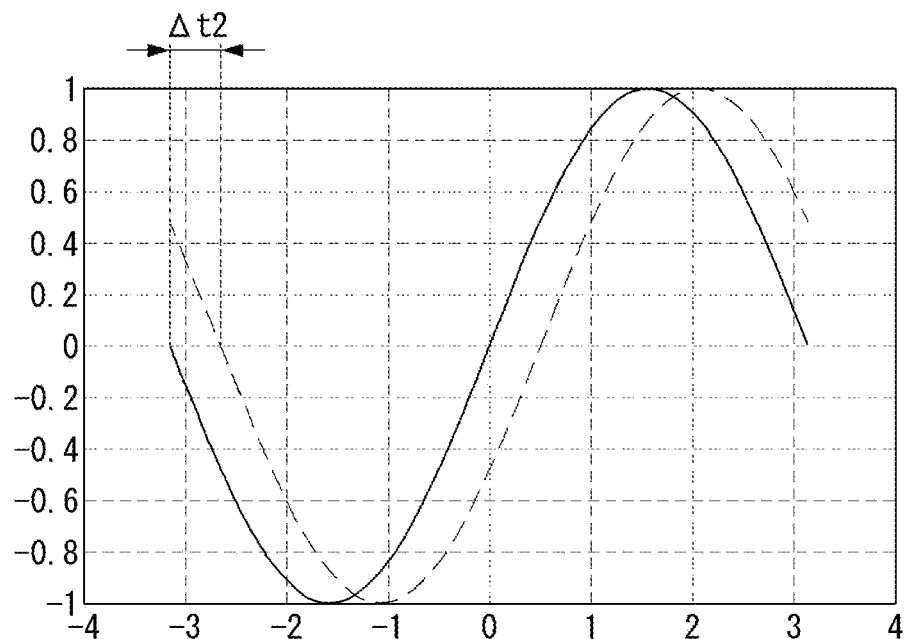

As shown in FIG. 14, a second time difference Δt2 may be calculated based on a third time at which the LF signal is arrived from the first transmitter T1 to the second receiver R2 and a fourth time at which the LF signal is arrived from the second transmitter T2 to the second receiver R2. An example of the second time difference Δt2 is shown in FIG. 15.

The second receiver R2 may be a receiver located closer to the first transmitter T1 and the second transmitter T2, but is not limited thereto.

In this case, the LF signals emitted from the first transmitter T1 and the second transmitter T2 may be synchronized with each other. For example, the first transmitter T1 and the second transmitter T2 may respectively emit the LF signals at the same time or with a preset time difference. Information on a time difference between the emission times of the signals emitted from the first transmitter T1 and the second transmitter T2 may be detected or stored in the EVD.

In addition, since the above-described second time difference Δt2 corresponds to a difference between times for electromagnetic waves to travel the distance through which the signals are transmitted, the second distance difference may be calculated by multiplying the second time difference by a speed of light.

Figure 16:
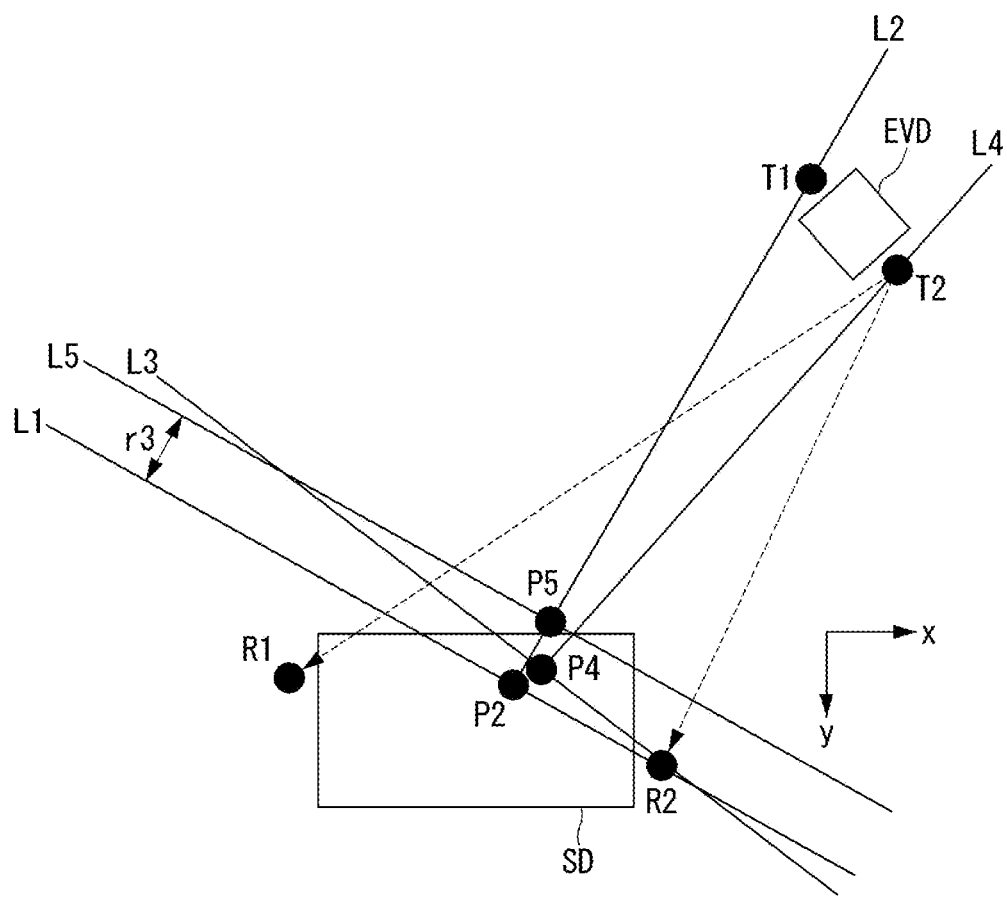

As shown in FIG. 16, a virtual tangent line L5 may be formed by moving the previously formed first tangent line L1 along the first normal line L2 by a distance corresponding to the second distance difference. The position of the fifth point P5, which is an orthogonal point between the virtual tangent line L5 and the first normal line L2, may be configured as (m, n).

The coordinates of the fifth point P5 may be obtained by solving Equations 6 and 7 below.

$$n - h = \frac{c-e}{d-f}(m - g) \quad \text{[Equation 6]}$$

$$(n - g)^2 + (m - h)^2 = r3^2 \quad \text{[Equation 7]}$$

In Equation 7, r3 may represent the second distance difference based on the second time difference.

In the present exemplary embodiment, the virtual tangent line L5 is obtained by moving the first tangent line L1 in parallel on the first normal line by the second distance difference r3, but the present disclosure is not limited thereto.

That is, the virtual tangent line L5 may vary according to a direction or posture of the EV toward the SD at a current position, in other words, may vary according to a relative positional change of T1 and T2 mounted on the EV. The virtual tangent line L5 may correspond to a parallel displacement of a tangent line meeting a circle having a small radius.

Using the above-described virtual tangent line L5, a position of the first transmitter T1, which is for configuring the distance between the first transmitter T1 and the fifth point P5 (hereinafter referred to as 'second reference distance) to be the same as the distance between the second transmitter T2 and the fourth point P4 (Hereinafter, 'first reference distance'), may be determined.

That is, since a difference in the distance between the first transmitter T1 and the second transmitter T2 is corrected, the position estimation may be performed so as to satisfy a condition in which the second transmitter T2 and the first transmitter T1 are located at the same distance from the two start points P4 and P5.

Using the first reference distance and the second reference distance, even when the position of the start point of the straight line (normal) component changes with time in the equation of each straight line calculated above, the coordinates of the first transmitter T1 may be easily calculated.

Figure 17:
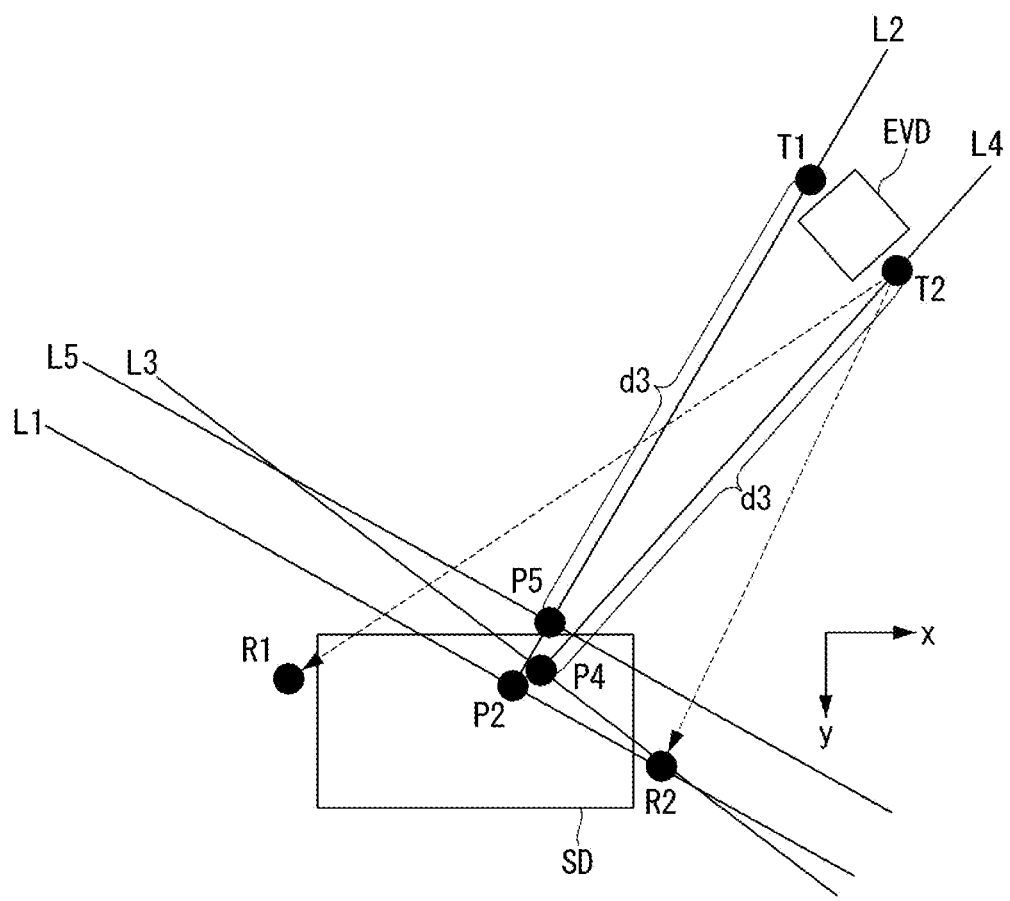

As shown in FIG. 17, an arbitrary point located on the first normal line L2 while having a predetermined distance d3 from the fifth point P5, that is, the position (x1, y1) of the first transmitter T1 may be obtained through Equations 8 and 9 below.

$$y1 - n = \frac{c-e}{d-f}(x1 - m) \quad \text{[Equation 8]}$$

$$(x1 - m)^2 + (y1 - n)^2 = d3^2 \quad \text{[Equation 9]}$$

In addition, an arbitrary point located on the second normal line L4 while having a predetermined distance d3 from the fourth point P4, that is, the position (x2, y2) of the second transmitter T2 may be obtained through Equations 10 and Equation 10 below.

$$y1 - n = \frac{c-e}{d-f}(x1 - m) \quad \text{[Equation 10]}$$

$$(x1 - m)^2 + (y1 - n)^2 = d3^2 \quad \text{[Equation 11]}$$

Here, when the distance between the first transmitter T1 and the second transmitter T2 is d2, Equation 12 below should be satisfied.

$$(x2-x1)^2+(y1-y2)^2=d2^2 \quad \text{[Equation 12]}$$

x1, y1, x2, and y2 that satisfy the Equations 8 to 12 may be obtained.

As described above, according to the present exemplary embodiment, the coordinates of the first receiver R1 and the second receiver R2, which are already known, and the coordinates of the first transmitter T1 and the second transmitter T2, which are calculated above, may be used to calculate the distance and angle between the center of the reception pad or the secondary device of the EV device mounted on the EV and the center of the transmission pad or the primary device of the supply device.

In addition, it is possible to calculate a point at which the distance between the coordinates of the start points of the two straight lines becomes the distance between the two transmitters, and since all positions can be expressed in coordinates, both the vehicle's entry angle and inclination can be easily calculated.

Since a condition in which a plurality of transmitters should be symmetrically arranged or a plurality of receivers should be symmetrically arranged is not necessary as a prerequisite of the distance estimation method according to the present exemplary embodiment, even when a plurality of receivers are randomly arranged, the positions of a plurality of transmitters mounted on the secondary device of the EV can be determined regardless of the positions of the receivers of the primary device, and thus the fine positioning can be performed reliably.

Figure 18:
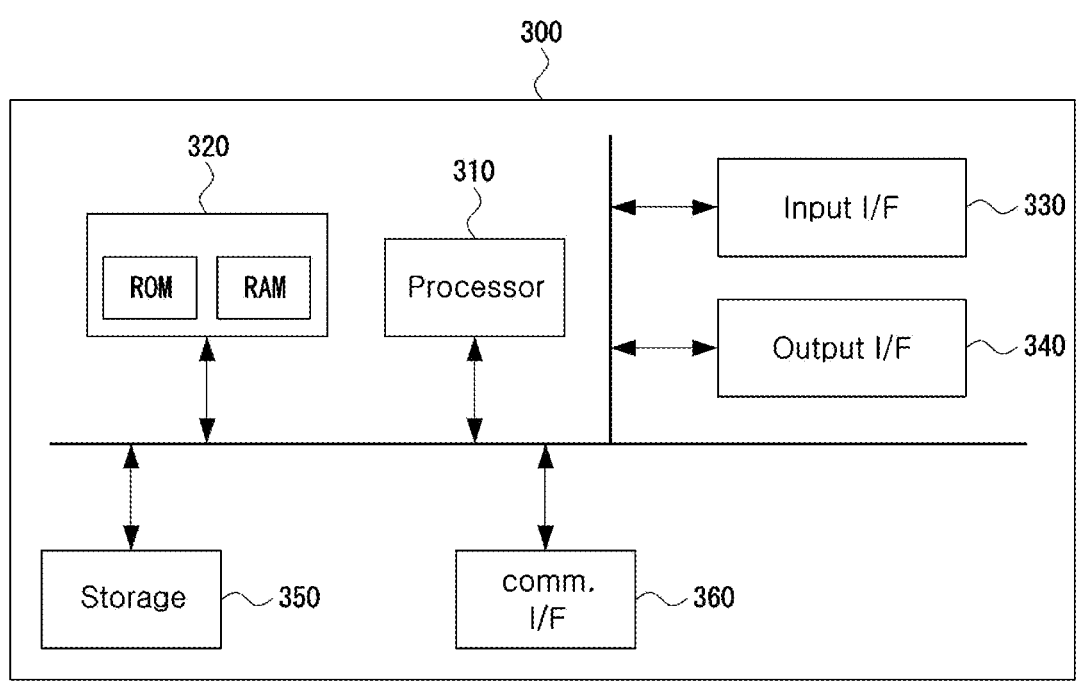
FIG. 18 is a schematic block diagram for describing main components of a distance estimation device for WPT fine positioning according to another exemplary embodiment of the present disclosure.

FIG. 18 is a schematic block diagram for describing main components of a distance estimation device for WPT fine positioning according to another exemplary embodiment of the present disclosure.

As shown in FIG. 18, a distance estimation device 300 may be a means mounted as a part of the EVCC or SECC, a means combined within the EVCC or SECC, or a function unit performing functions corresponding to those of the means, and may include at least one processor 310 and a memory 320. In addition, the distance estimation device 300 for fine positioning may further include an input interface 330, an output interface 340, and a storage device 350. In addition, the distance estimation device 300 for fine positioning may include a communication interface 360. The communication interface 360 may correspond to a transmitting/receiving device for network access.

The processor 310 may execute program instructions stored in the memory 320 and/or storage device 350. The processor 310 may be implemented as at least one central processing unit (CPU) or graphics processing unit (GPU), or implemented as other processors capable of performing the method according to the present disclosure.

The memory 320 may include, for example, a volatile memory such as read only memory (ROM) and a non-volatile memory such as random access memory (RAM).

The memory 320 may load the program instructions stored in the storage device 350 and provide the loaded program instructions to the processor 310.

The storage device 350 is a recording medium suitable for storing the program instructions and data, such as a magnetic medium such as a hard disk, floppy disk, and magnetic tape, an optical medium such as a compact disk read only memory (CD-ROM), digital versatile disk (DVD), a magneto-optical medium such as a floptical disk, or a semiconductor memory such as a flash memory, erasable programmable ROM (EPROM), or solid state drive (SSD) made based thereon.

The storage device 350 may store program instructions. The program instructions may include program instructions for implementing the distance estimation method for WPT fine positioning according to the present disclosure. The program instructions may be implemented so that the processor 310 performs the distance estimation procedure for fine positioning described above with reference to FIG. 8 in a state of being loaded in the processor 310 when executed by the processor 310. For example, the program instructions may include instructions for LF signal transmission, instructions for LF signal-related response reception, instructions for time difference calculation, instructions for distance difference calculation, instructions for forming circles, instructions for forming tangent lines, instructions for center point calculation, instructions for forming normal lines, instructions for forming equations, instructions for solving simultaneous equations, instructions for position calculation, instructions for distance calculation, instructions for angle calculation, and the like.

Meanwhile, functions or configurations of the input interface 330, the output interface 340, and the communication interface 360 are obvious to those skilled in the art to which the present disclosure belongs, so detailed descriptions thereof are omitted.

Meanwhile, the position estimation methods for fine positioning, which have been described in the above-described exemplary embodiments, may be implemented as computer-readable programs or codes on a computer-readable recording medium. The computer-readable recording medium may include all types of storage devices in which data that can be read by a computer system is stored. In addition, the computer-readable recording medium may be distributed to computer systems connected through a network to store and execute the computer-readable programs or codes in a distributed manner.

The computer-readable recording medium may include hardware devices specially configured to store and execute program instructions, such as ROM, RAM, and flash memory. The program instructions may include high-level language codes that can be executed by a computer using an interpreter or the like as well as machine codes generated by a compiler.

Some aspects of the present disclosure have been described above in the context of a device but may be described using a method corresponding thereto. Here, blocks or the device corresponds to operations of the method or characteristics of the operations of the method. Similarly, aspects of the present disclosure described above in the context of a method may be described using blocks or items corresponding thereto or characteristics of a device corresponding thereto. Some or all of the operations of the method may be performed, for example, by (or using) a hardware device such as a microprocessor, a programmable computer or an electronic circuit. In some embodiments, at least one of most important operations of the method may be performed by such a device.

In exemplary embodiments, a programmable logic device (e.g., a field-programmable gate array) may be used to perform some or all of functions of the methods described herein. In embodiments, the field-programmable gate array may be operated with a microprocessor to perform one of the methods described herein. In general, the methods are preferably performed by a certain hardware device.

While the present disclosure has been described above with respect to embodiments thereof, it would be understood by those of ordinary skill in the art that various changes and modifications may be made without departing from the technical conception and scope of the present disclosure defined in the following claims.

What is claimed is:

1. A position estimation method for fine positioning, performed by an electric vehicle (EV) or an EV device having an EV communication controller (EVCC) connected with a supply equipment communication controller (SECC) of a supply device through a network and a secondary device equipped with at least a first transmitter and a second transmitter, the position estimation method comprising:
defining a position of the first transmitter as a point on a first straight line directed toward a center of a primary device of the supply device;
defining a position of the second transmitter as a point on a second straight line directed toward the center of the primary device;
compensating for an interval between the first transmitter and the second transmitter on the first straight line or the second straight line based on a time difference of low-frequency (LF) signals of the first transmitter and the second transmitter arriving at the primary device; and
calculating the position of the first transmitter and the position of the second transmitter such that a first distance from a first start point on the first straight line to the first transmitter becomes equal to a second distance from a second start point on the second straight line to the second transmitter through the compensating.

2. The position estimation method according to claim 1, wherein in the compensating, the first start point on the first straight line, which is determined based on a time difference between signal reception times at a first receiver and a second receiver of the primary device for a first LF signal of the first transmitter in the defining of the position of the first transmitter, is moved on the first straight line by a distance obtained by multiplying the time difference by a speed of light.

3. The position estimation method according to claim 2, wherein the second receiver is located closer to the first transmitter and the second transmitter than the first receiver.

4. The position estimation method according to claim 1, wherein in the compensating, the second start point on the second straight line, which is determined based on a time difference between signal reception times at a first receiver and a second receiver of the primary device for a second LF signal of the second transmitter in the defining of the position of the second transmitter, is moved on the second straight line by a distance obtained by multiplying the time difference by a speed of light.

5. The position estimation method according to claim 4, wherein the first receiver is located closer to the first transmitter and the second transmitter than the second receiver.

6. The position estimation method according to claim 1, further comprising: determining a position on the first straight line and a position on the second straight line where an interval between the first straight line and the second straight line is equal to a distance between the first transmitter and the second transmitter as the position of the first transmitter and the position of the second transmitter, respectively.

7. The position estimation method according to claim 6, further comprising: determining a distance and a direction of a center of the secondary device with respect to a center of the primary device, which is obtained based on the position of the first transmitter and the position of the second transmitter.

8. The position estimation method according to claim 1, wherein the defining of the position of the first transmitter comprises:
calculating a first time difference between reception times at a first receiver and a second receiver for a first LF signal;
generating a first circle having a radius of half of a distance obtained by multiplying the first time difference by a speed of light with the second receiver as a center;
generating a first tangent line that passes through the first receiver and is tangent to the first circle; and
generating the first straight line passing through the first receiver and orthogonal to the first tangent line,
wherein the position of the first transmitter is located on the first straight line with a second point where the first tangent line and the first straight line meet as a start point.

9. The position estimation method according to claim 1, wherein the defining of the position of the second transmitter comprises:
calculating a second time difference between reception times at a first receiver and a second receiver for a second LF signal;
generating a second circle having a radius of half of a distance obtained by multiplying the second time difference by a speed of light with the second receiver as a center;
generating a first tangent line that passes through the first receiver and is tangent to the second circle; and
generating the second straight line passing through the first receiver and orthogonal to the second tangent line,
wherein the position of the second transmitter is located on the second straight line with a fourth point where the second tangent line and the second straight line meet as a start point.

10. A position estimation method for fine positioning, performed by an electric vehicle (EV) or an EV device having an EV communication controller (EVCC) connected with a supply equipment communication controller (SECC) of a supply device through a network and a secondary device equipped with at least a first transmitter and a second transmitter, the position estimation method comprising:
transmitting a first low frequency (LF) signal to a first receiver and a second receiver of a primary device of the supply device through the first transmitter, and defining a position of the first transmitter on a first straight line extending in a radial direction from a reference point of the supply based on receiving a response related to the first LF signal from the SECC;
defining a position of the second transmitter on a second straight line extending in a radial direction from the reference point of the supply device based on transmitting a second LF signal to the first receiver and the second receiver through the second transmitter;
calculating a time difference between the first LF signal and the second LF signal arriving at a receiver closer to the first transmitter and the second transmitter;
in response to a transmitter located closer to the primary device being the first transmitter, determining a first-a start point obtained by moving a first start point of the first straight line toward the first transmitter on the first straight line by the time difference; and
determining the position of the first transmitter located on the first straight line as a point where a distance from the first-a start point is the same as a distance between a second start point of the second straight line and the second transmitter.

11. The position estimation method according to claim 10, further comprising:
in response to the transmitter located closer to the primary device being the second transmitter, determining a second-a start point obtained by moving a second start point of the second straight line toward the second transmitter on the second straight line by the time difference; and
determining the position of the second transmitter located on the second straight line as a point where a distance from the second-a start point is the same as a distance between the first start point of the first straight line and the first transmitter.

12. The position estimation method according to claim 10, wherein the defining of the position of the first transmitter comprises:
calculating a first time difference between reception times at the first receiver and the second receiver for the first LF signal;
generating a first circle having a radius of half of a distance obtained by multiplying the first time difference by a speed of light with the second receiver as a center;
generating a first tangent line that passes through the first receiver and is tangent to the first circle; and
generating a first normal line passing through the first receiver and orthogonal to the first tangent line,
wherein the position of the first transmitter is located on the first normal line with a second point where the first tangent line and the first normal line meet as a start point.

13. The position estimation method according to claim 10, wherein the defining of the position of the second transmitter comprises:
calculating a second time difference between reception times at the first receiver and the second receiver for the second LF signal;
generating a second circle having a radius of half of a distance obtained by multiplying the second time difference by a speed of light with the second receiver as a center;
generating a second tangent line that passes through the first receiver and is tangent to the second circle; and
generating a second normal line passing through the first receiver and orthogonal to the second tangent line,
wherein the position of the second transmitter is located on the second normal line with a fourth point where the second tangent line and the second normal line meet as a start point.

14. The position estimation method according to claim 10, further comprising:
determining a position on the first normal line and a position on the second normal line where an interval between the first tangent line and the second tangent line is equal to a distance between the first transmitter and the second transmitter as the position of the first transmitter and the position of the second transmitter, respectively.

15. The position estimation method according to claim 14, further comprising:
determining a distance and a direction of a center of the secondary device with respect to a center of the primary device, which is obtained based on the position of the first transmitter and the position of the second transmitter.

16. A position estimation apparatus for fine positioning, performed by an electric vehicle (EV) or an EV device having an EV communication controller (EVCC) connected with a supply equipment communication controller (SECC) of a supply device through a network and a secondary device equipped with at least a first transmitter and a second transmitter, the position estimation apparatus comprising:
a processor; and
a memory storing instructions executable by the processor,
wherein when executed by the processor, the instructions cause the processor to perform:
defining a position of the first transmitter as a point on a first straight line directed toward a center of a primary device of the supply device;
defining a position of the second transmitter as a point on a second straight line directed toward the center of the primary device;
compensating for an interval between the first transmitter and the second transmitter on the first straight line or the second straight line based on a time difference of LF signals of the first transmitter and the second transmitter arriving at the primary device; and
calculating the position of the first transmitter and the position of the second transmitter such that a first distance from a first start point on the first straight line to the first transmitter becomes equal to a second distance from a second start point on the second straight line to the second transmitter through the compensating.

17. The position estimation apparatus according to claim 16, wherein the instructions cause the processor to perform:
in the compensating, moving the first start point on the first straight line, which is determined based on a time difference between signal reception times at a first receiver and a second receiver of the primary device for a first LF signal of the first transmitter in the defining of the position of the first transmitter, on the first straight line by a distance obtained by multiplying the time difference by a speed of light.

18. The position estimation apparatus according to claim 16, wherein the instructions cause the processor to perform:
in the compensating, moving the second start point on the second straight line, which is determined based on a time difference between signal reception times at a first receiver and a second receiver of the primary device for a second LF signal of the second transmitter in the defining of the position of the second transmitter, on the second straight line by a distance obtained by multiplying the time difference by a speed of light.

19. The position estimation apparatus according to claim 16, wherein the instructions cause the processor to perform:
in the defining of the position of the first transmitter,
calculating a first time difference between reception times at a first receiver and a second receiver for a first LF signal;
generating a first circle having a radius of half of a distance obtained by multiplying the first time difference by a speed of light with the second receiver as a center;
generating a first tangent line that passes through the first receiver and is tangent to the first circle; and
generating the first straight line passing through the first receiver and orthogonal to the first tangent line,
wherein the position of the first transmitter is located on the first straight line with a second point where the first tangent line and the first straight line meet as a start point.

20. The position estimation apparatus according to claim 16, wherein the instructions causes the processor to perform:
in the defining of the position of the second transmitter,
calculating a second time difference between reception times at a first receiver and a second receiver for a second LF signal;
generating a second circle having a radius of half of a distance obtained by multiplying the second time difference by a speed of light with the second receiver as a center;
generating a first tangent line that passes through the first receiver and is tangent to the second circle; and
generating the second straight line passing through the first receiver and orthogonal to the second tangent line,
wherein the position of the second transmitter is located on the second straight line with a fourth point where the second tangent line and the second straight line meet as a start point.

* * * * *